(12) United States Patent
Chang et al.

(10) Patent No.: US 11,890,802 B2
(45) Date of Patent: Feb. 6, 2024

(54) MOLDING DEVICE AND SYSTEM FOR PRODUCING MOLDED ARTICLE

(71) Applicants: KYORAKU CO., LTD., Kyoto (JP); SIKA MACHINERY CO., LTD., Taiping (TW)

(72) Inventors: Tzu Chiang Chang, Taiping (TW); Shuji Ito, Yamato (JP)

(73) Assignees: KYORAKU CO., LTD., Kyoto (JP); SIKA MACHINERY CO., LTD., Taichung (TW)

( * ) Notice: Subject to any disclaimer, the term of this patent is extended or adjusted under 35 U.S.C. 154(b) by 203 days.

(21) Appl. No.: 17/422,882

(22) PCT Filed: Jan. 23, 2020

(86) PCT No.: PCT/JP2020/002257
§ 371 (c)(1),
(2) Date: Jul. 14, 2021

(87) PCT Pub. No.: WO2020/158558
PCT Pub. Date: Aug. 6, 2020

(65) Prior Publication Data
US 2022/0063140 A1    Mar. 3, 2022

(30) Foreign Application Priority Data

Jan. 30, 2019 (JP) ................... 2019-014093
Jan. 30, 2019 (JP) ................... 2019-014107
Sep. 12, 2019 (JP) ................... 2019-166200

(51) Int. Cl.
*B29C 49/72*  (2006.01)
*B29C 31/00*  (2006.01)
(Continued)

(52) U.S. Cl.
CPC ............ *B29C 49/72* (2013.01); *B29C 31/006* (2013.01); *B29C 33/22* (2013.01); *B29C 33/30* (2013.01);
(Continued)

(58) Field of Classification Search
CPC ............ B29C 49/0064; B29C 49/0062; B29C 49/48185; B29C 49/54; B29C 49/72; B29C 49/42069
See application file for complete search history.

(56) References Cited

U.S. PATENT DOCUMENTS 2,541,249 A * 2/1951 Hobson ................... B29C 49/50
264/526
3,394,209 A * 7/1968 Cheney ............... B29C 48/0017
264/533
(Continued)

FOREIGN PATENT DOCUMENTS

CN   102009467 A    4/2011
DE   19916399 A1   10/2000
(Continued)

OTHER PUBLICATIONS

Machine translation of Okuma et al. (WO 2015/136793 A1) Sep. 17, 2015 (Year: 2015).*

(Continued)

*Primary Examiner* — Benjamin A Schiffman
(74) *Attorney, Agent, or Firm* — Maier & Maier, PLLC

(57) ABSTRACT

A molding apparatus provided with a transfer capable of transferring a heavy-weight mold clamping device. The molding apparatus that molds a molded product, includes: a mold clamping device clamping a parison extruded from an extruder to obtain a molded body, a transfer rail to support the mold clamping device in a transferable manner, and an electric cylinder to transfer the mold clamping device along (Continued)

the transfer rail. The mold clamping device includes first and second platens for holding a die, and a clamping drive unit for driving the first and second platens closer to or separated from each other, the electric cylinder includes a motor having an output shaft and a feed screw mechanism that converts the rotary motion of the output shaft into a linear motion.

7 Claims, 32 Drawing Sheets

(51) Int. Cl.
    *B29C 33/22*     (2006.01)
    *B29C 33/30*     (2006.01)
    *B29C 33/44*     (2006.01)
    *B29C 37/02*     (2006.01)
    *B29C 49/04*     (2006.01)
    *B29C 49/32*     (2006.01)
    *B29C 49/56*     (2006.01)

(52) U.S. Cl.
    CPC .............. *B29C 33/44* (2013.01); *B29C 37/02* (2013.01); *B29C 49/04* (2013.01); *B29C 49/32* (2013.01); *B29C 49/56* (2013.01); *B29C 2049/725* (2013.01)

(56) References Cited

U.S. PATENT DOCUMENTS

| | | | | |
|---|---|---|---|---|
| 4,717,523 A * | 1/1988 | Evely | ...................... | B29C 49/36 264/527 |
| 5,249,947 A * | 10/1993 | Inaba | ...................... | B29C 45/73 901/6 |
| 5,469,612 A * | 11/1995 | Collette | ............... | B65D 23/106 215/396 |
| 2003/0017229 A1 | 1/2003 | Langos et al. | | |
| 2004/0108606 A1 | 6/2004 | Goggins | | |
| 2006/0111474 A1 * | 5/2006 | Engelbrecht | .......... | C08F 292/00 523/218 |
| 2014/0183796 A1 | 7/2014 | Huang et al. | | |
| 2014/0368135 A1 * | 12/2014 | Ito | ........................... | H02P 6/183 318/400.02 |
| 2017/0305060 A1 * | 10/2017 | Pinardi | .................... | B29C 49/60 |
| 2019/0022910 A1 * | 1/2019 | Ikegaya | .................. | B29C 45/80 |
| 2019/0389117 A1 | 12/2019 | Harigome | | |
| 2021/0178653 A1 * | 6/2021 | Shimada | ................. | B29C 49/50 |
| 2021/0394420 A1 | 12/2021 | Horigome | | |

FOREIGN PATENT DOCUMENTS

| | | | | |
|---|---|---|---|---|
| DE | 102009052816 A1 | | 5/2011 | |
| EP | 1233858 B1 | | 11/2003 | |
| JP | S43-17819 B1 | | 7/1968 | |
| JP | S57-74136 A | | 5/1982 | |
| JP | H02-29316 A | | 1/1990 | |
| JP | H03-39223 A | | 2/1991 | |
| JP | H03-166082 A | | 7/1991 | |
| JP | H03-272822 A | | 12/1991 | |
| JP | H04-73527 A | | 3/1992 | |
| JP | H07-032366 A | | 2/1995 | |
| JP | H11-286043 A | | 10/1999 | |
| JP | 2002-059467 A | | 2/2002 | |
| JP | 2003-103616 A | | 4/2003 | |
| JP | 2004-255598 A | | 9/2004 | |
| JP | 2007-527323 A | | 9/2007 | |
| JP | 2010-042557 A | | 2/2010 | |
| JP | 2017-128007 A | | 7/2017 | |
| JP | 2018103328 A | * | 7/2018 | |
| JP | 2019-104237 A | | 6/2019 | |
| TW | 201741113 A | | 12/2017 | |
| WO | WO-2004096516 A1 | * | 11/2004 | ............. B23D 79/08 |
| WO | WO-2015136793 A1 | * | 9/2015 | ............. B29C 37/02 |

OTHER PUBLICATIONS

Machine translation of Uchiyama et al. (JP 2003103616 A) Apr. 9, 2003 (Year: 2003).*
Partial Supplementary European Search Report dated Jan. 25, 2022, of corresponding European application No. 20748237.3; 16 pages.
International Search Report dated Mar. 24, 2020 in corresponding International application No. PCT/JP2020/002257; 14 pages.
Office Action dated May 3, 2023 in corresponding Taiwanese Application No. 109102596; 17 pages.
Office Action dated Feb. 21, 2023, in corresponding Japanese Application No. 2019-014107, 10 pages.
Office Action dated Nov. 23, 2023, in corresponding Taiwanese Application No. 109102596, 26 pages.

* cited by examiner

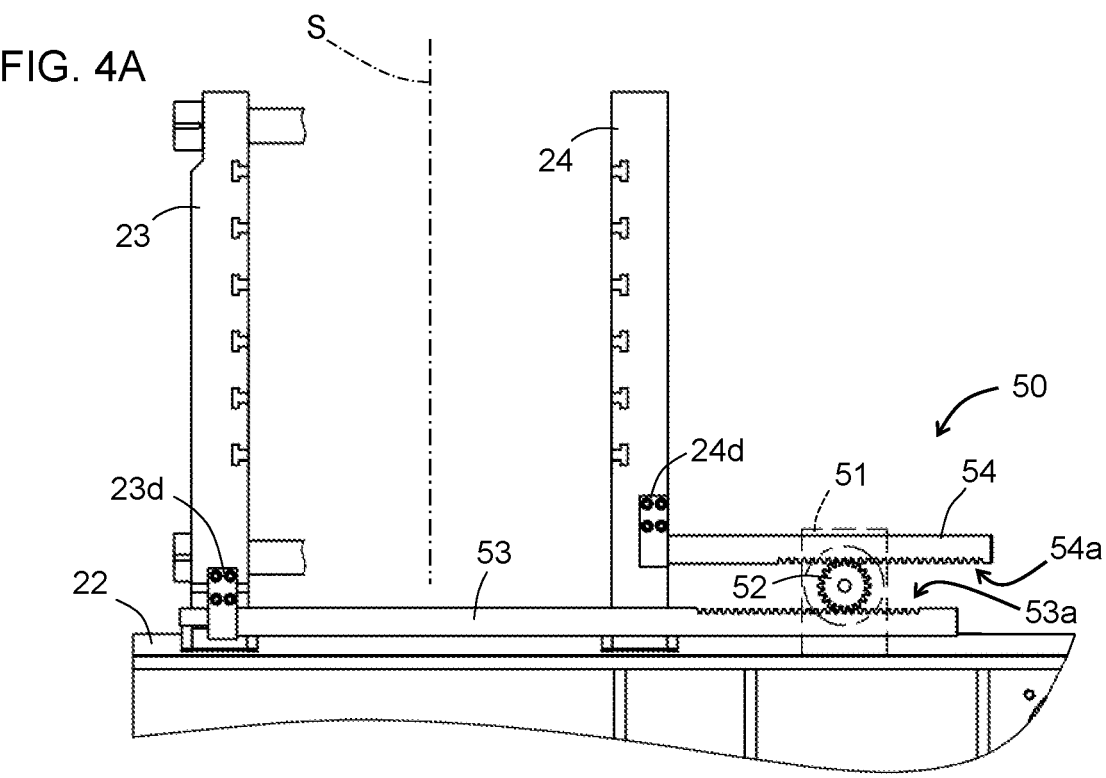
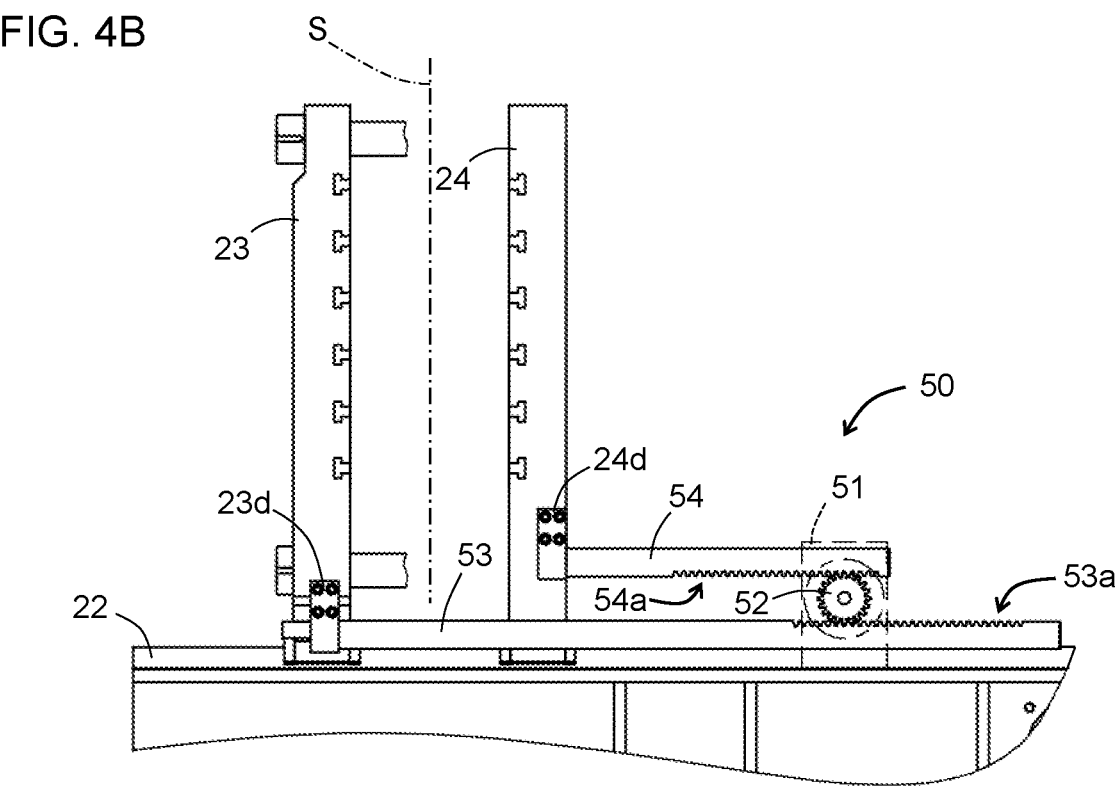

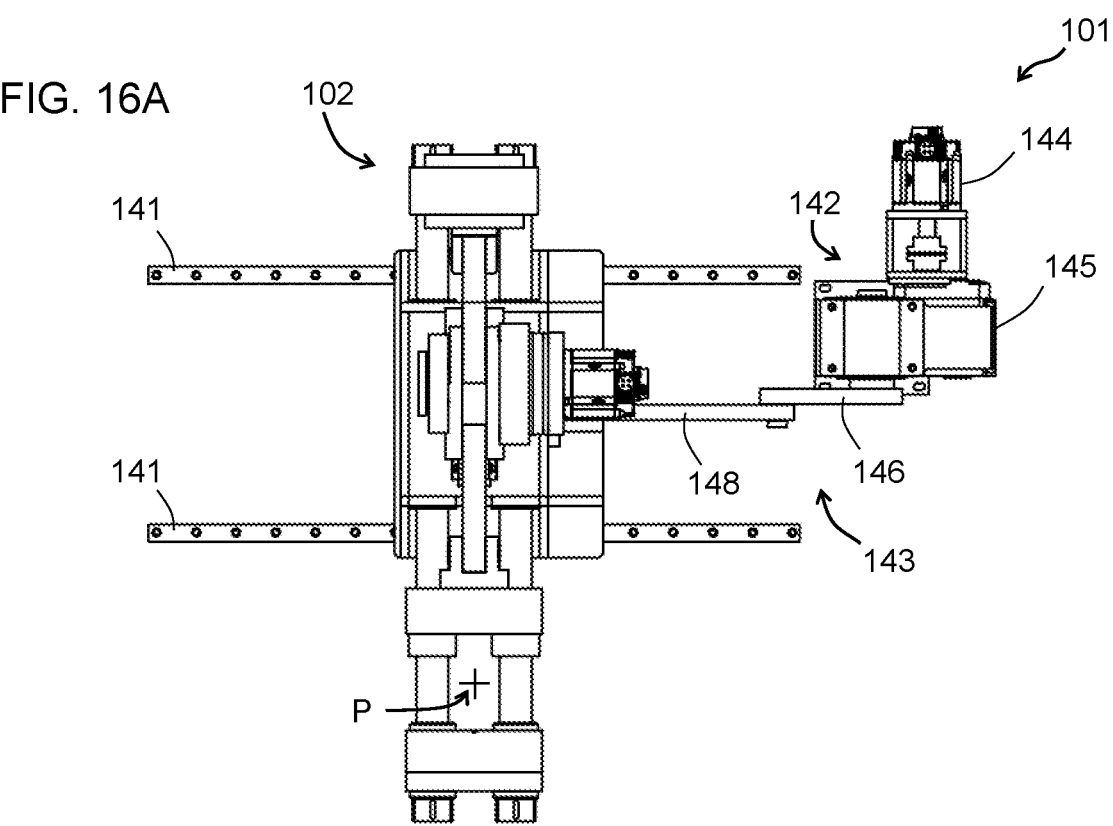
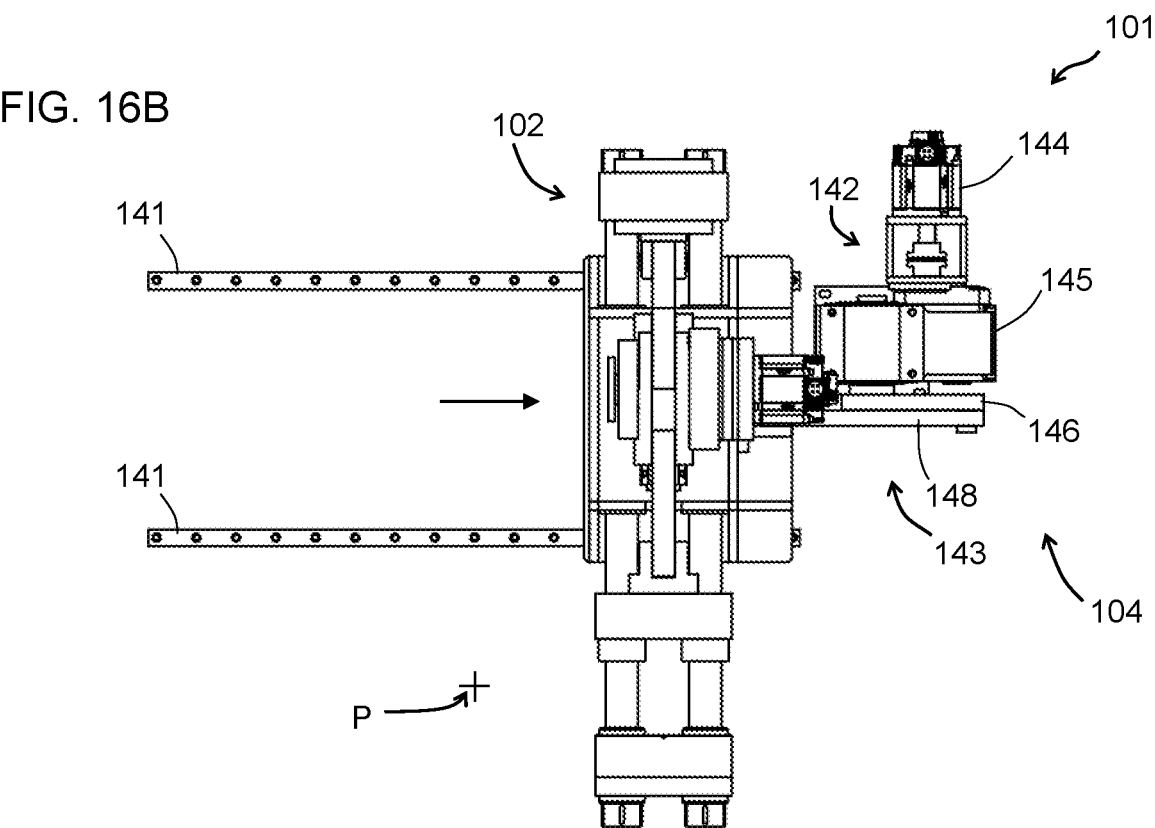

MOLDING DEVICE AND SYSTEM FOR PRODUCING MOLDED ARTICLE

FIELD

The present invention relates to a molding apparatus capable of transferring a mold clamping device that opens and closes a die. The present invention also relates to a molded product manufacturing system using a blow molding machine, particularly a molded product manufacturing system in which deburring is performed by a deburring device after molding by the blow molding machine.

BACKGROUND

First and Second Viewpoints

Conventionally, there is used a molding apparatus configured to store a parison supplied from an extruder in a die of a mold clamping device and configured to obtain an molded body. For example, Patent Literature 1 discloses a mold clamping device capable of synchronizing a pair of platens for fixing dies and moving them toward a predetermined parting line (a clamping reference plane). Some of such molding apparatuses are provided with a transfer means in order for transferring the mold clamping device in order to attach/detach and maintain the die.

Third Viewpoint

Conventionally, there is a molded product manufacturing system with a robot for transporting a molded body molded by a blow molding machine to the place where the next process is performed. For example, Patent Literature 2 discloses a configuration in which a multi-axis robot (articulated robot) is used to transport a molded body.

CITATION LIST

Patent Literature

Patent Literature 1: JPA-H7-32366
Patent Literature 2: JPA-2003-103616

First Viewpoint

By the way, there remains a burr portion that protrudes from the pinch-off of the die on the molded body taken out from the die after mold clamping with the mold clamping device, and the burr portion must be removed. It is effective to increase the clamping force of the mold clamping device in order to facilitate the removal of the burr portion, but in order to increase the clamping force, the mold clamping device (particularly, the clamping drive unit) needs to be large or complicated.

However, if the weight of the mold clamping device increases due to the increase in size and complexity, the load on the motor that drives the transfer means increases. Therefore, when sudden acceleration/deceleration is performed, for example, there is a risk of overloading the motor of the transfer means.

The present invention has been made in view of such circumstances and is to provides a molding apparatus provided with a transfer means capable of transferring a heavyweight mold clamping device.

Second Viewpoint

However, the conventional transfer means has a configuration in which the mold clamping device is transferred by the rotation of the ball screw, and the transfer takes a long time.

The present invention has been made in view of such circumstances and provides a molding apparatus provided with a transfer mechanism capable of transferring the mold clamping device at a high speed.

Third Viewpoint

However, in the conventional molded product manufacturing system as described in Patent Literature 2, since the multi-axis robot is installed on the floor surface, there is a problem that the installation area of the molded product manufacturing system as a whole tends to be large.

The present invention has been made in view of such circumstances and provides a molded product manufacturing system capable of reducing the installation area.

First Viewpoint

The present invention provides a molding apparatus that molds a molded product, comprising: a mold clamping device clamping a parison extruded from an extruder to obtain a molded body, a transfer rail to support the mold clamping device in a transferable manner, and an electric cylinder to transfer the mold clamping device along the transfer rail, wherein, the mold clamping device comprises first and second platens for holding a die, and a clamping drive unit for driving the first and second platens closer to or separated from each other, the electric cylinder comprises a motor having an output shaft and a feed screw mechanism that converts the rotary motion of the output shaft into a linear motion, and, the electric cylinder further comprises at least one of the following configurations 1) and 2).

1) The motor is a brake motor having a brake, and the rotation of the output shaft can be braked by the brake.
2) A clutch is provided, and the clutch can switch between a state in which the output shaft and the feed screw mechanism are connected and a state in which the connection between the output shaft and the feed screw mechanism is loosened.

According to the present invention, for example, when the mold clamping device being transferred is suddenly decelerated by an electric cylinder as a transfer means, if the above configuration (1) is provided, the rotation of the output shaft due to the inertial force of the mold clamping device is braked by the brake. Therefore, the load applied to the motor can be reduced even if the mold clamping device is heavy. Further, if the configuration (2) is provided, when the load (torque) becomes large, the load applied to the motor can be reduced by loosening the connection between the output shaft and the feed screw mechanism by the clutch.

Preferably, the mold clamping device comprises a third platen connected to the first platen via a tie-bar, the clamping drive unit comprises a slide drive means and a toggle mechanism, wherein the toggle mechanism connects the second platen and the third platen and causes the second and third platens closer to or separated from each other by driving the slide drive means.

Preferably, the toggle mechanism includes a pair of first toggle links, a pair of second toggle links, a pair of auxiliary links, and a connecting member, wherein, one end side of the first toggle links are rotatably connected to the third platen, the other end side of the first toggle links are rotatably connected to one end side of the second toggle links, the other end side of the second toggle links are rotatably connected to the second platen, one end side of the auxiliary links are rotatably connected to the first toggle links, the other end side of the auxiliary links are rotatably connected to the connecting member, and, the slide drive means is configured to move the connecting member in the mold clamping direction.

Preferably, the mold clamping device comprises a mold clamping rail and a clamping reference plane holding unit, the mold clamping rail supports the first to third platens so as to be horizontally movable, and the clamping reference plane holding unit is configured such that the first and second platens move symmetrically with respect to the clamping reference plane of the die.

Preferably, the transfer rail extends in a direction perpendicular to the clamping direction of the mold clamping device.

Second Viewpoint

The present invention provides a molding apparatus that molds a molded product, comprising: a mold clamping device clamping a parison extruded from an extruder to obtain a molded body, and a transfer means to support the mold clamping device in a transferable manner, wherein, the mold clamping device comprises a pair of platens for holding a die and a clamping drive unit for driving the pair of platens closer to or separated from each other, and the transfer means comprises a transfer rail extending along the transfer direction of the mold clamping device, a link mechanism for transferring the mold clamping device along the transfer rail, and a rotary drive means for driving the link mechanism.

According to the present invention, the mold clamping device slides along the transfer rail by the link mechanism and a rotary drive means. Therefore, it is possible to transfer the mold clamping device at a higher speed than the method using a ball screw.

Preferably, the transfer rail extends in a direction perpendicular to the clamping direction of the mold clamping device.

Preferably, the rotary drive means is fixed to an installation location, the link mechanism comprises first and second arms, the base end side of the first arm is connected to an output shaft of the rotary drive means, the tip end side of the first arm is rotatably connected to the base end side of the second arm, and the tip end side of the second arm is rotatably connected to the mold clamping device.

Preferably, the link mechanism comprises first, second and third arms, the transfer means further comprises a fixing member fixed to an installation location and a rail for the rotary drive means slidably supports the rotary drive means, the base end side of the first arm is rotatably connected to the fixing member, the tip end side of the first arm is rotatably connected to the base end side of the second arm, the tip end side of the second arm is rotatably connected to the base end side of the third arm, the tip end side of the third arm is rotatably connected to the mold clamping device, and the rotary drive means is configured to rotate the second arm around a position between the connection position with the first arm and the connection position with the third arm as a rotation center and is configured to slides on the rail due to the rotation.

Third Viewpoint

According to the present invention, a molded product manufacturing system having a blow molding machine, a multi-axis robot, a support frame, and a deburring device, wherein, a pair of dies of the blow molding machine are arranged so as to open in the first direction substantially parallel to the ground plane, the multi-axis robot comprises a base portion and a multi-axis arm portion connected to the base portion, and is configured to convey a molded body molded by the blow molding machine by a hand portion mounted on the arm portion, the support frame has a support surface that supports the base portion, the deburring device is configured to separate the molded body into a molded main body that will become a molded product and burrs, the multi-axis robot and the deburring device are arranged at positions displaced from the blow molding machine in the second direction perpendicular to the first direction and the vertical axis, and the angle between the normal of the support surface and the first direction is 45° or less.

According to the present invention, the base portion of the multi-axis robot is supported by the support surface of the support frame in which the angle formed by the normal direction and the first direction is 45° or less. Therefore, it is possible to reduce the installation area of the entire molded product manufacturing system as compared with the case where the base portion is supported by the floor surface.

Preferably, the multi-axis robot has at least 6 degrees of freedom.

Preferably, the base portion is supported by the support surface above the deburring device.

Preferably, the multi-axis robot and the deburring device are arranged along the first direction.

Preferably, a cutting device for cutting the molded main body is further provided, and the multi-axis robot, the deburring device, and the cutting device are arranged along the first direction.

Preferably, the deburring device separates the burr from the molded main body while the multi-axis robot supports the molded body from above.

Preferably, one of the pair of dies has an undercut structure.

Preferably, the blow molding machine comprises a resin supply device, first and second mold clamping devices, and a mold clamping device transfer means, the resin supply device is configured to drop a parison, the first and second mold clamping device each include the pair of dies, the mold clamping device transfer means is configured to transfer the first and second mold clamping device in the second direction so that the first and second mold clamping device each can clamp the parison, two multi-axis robots and two deburring devices are provided, and, the one multi-axis robot and the one deburring device are provided on one side of the blow molding machine, and the other multi-axis robot and the other deburring device are provided on the other side of the blow molding machine.

BRIEF DESCRIPTION OF DRAWINGS

FIG. 4A is an explanatory views showing the operation of a clamping reference plane holding unit 50 of the mold clamping device 2 of FIG. 1.

FIG. 4B is an explanatory view showing the operation of a clamping reference plane holding unit 50 of the mold clamping device 2 of FIG. 1.

FIG. 16A is an explanatory views showing the operation of a transfer means 104 of the molding apparatus 101 of FIG. 13.

FIG. 16B is an explanatory view showing the operation of a transfer means 104 of the molding apparatus 101 of FIG. 13.

DETAILED DESCRIPTION

Embodiments of the present invention are described below. Various characteristics in the embodiments described below may be combined with each other. Each characteristic is independently inventive.

Embodiment of First Viewpoint

Figure 1:
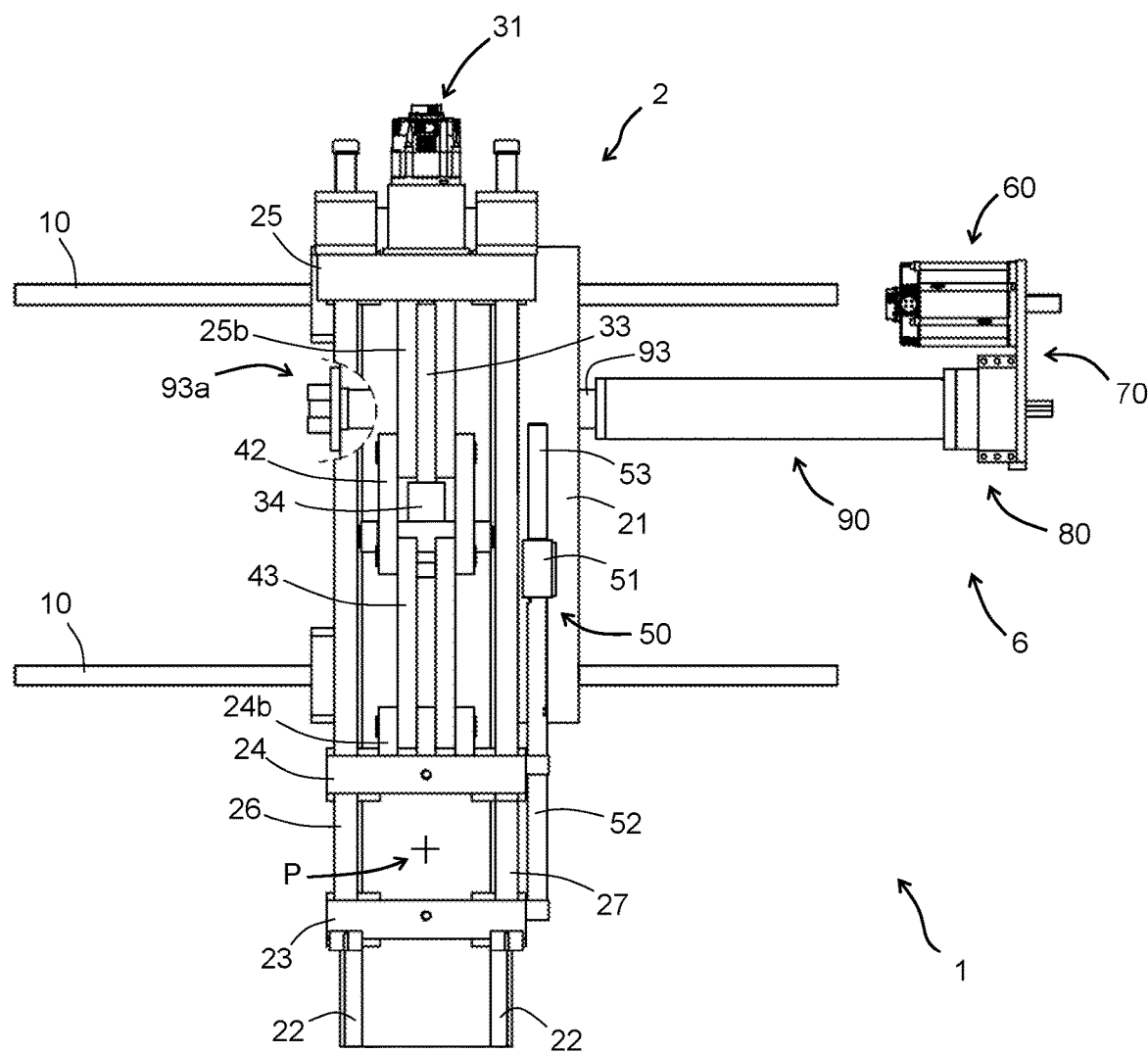
FIG. 1 is a plan view showing a molding apparatus 1 according to a first embodiment of the first viewpoint of the present invention.

As shown in FIG. 1, a molding apparatus 1 according to an embodiment of the first viewpoint of the present invention comprises a mold clamping device 2, an electric cylinder 6 as a transfer means, and transfer rails 10. The mold clamping device 2 is a device for clamping a cylindrical parison supplied from an extruder 11 (see FIG. 2A) and blowing air to obtain a molded body. The electric cylinder 6 transfers the mold clamping device 2 mounted on the transfer rails 10 along the transfer rails 10. The transfer rails 10 supports the mold clamping device 2 so as to be transferable. In the present embodiment, two transfer rails 10 are provided along the transfer direction of the mold clamping device 2, and the transfer rails 10 extend in a direction perpendicular to the mold clamping direction of the mold clamping device 2. Hereinafter, the configurations and operations of the mold clamping device 2 and the electric cylinder 6 will be described.

Mold Clamping Device 2

Figure 2A:
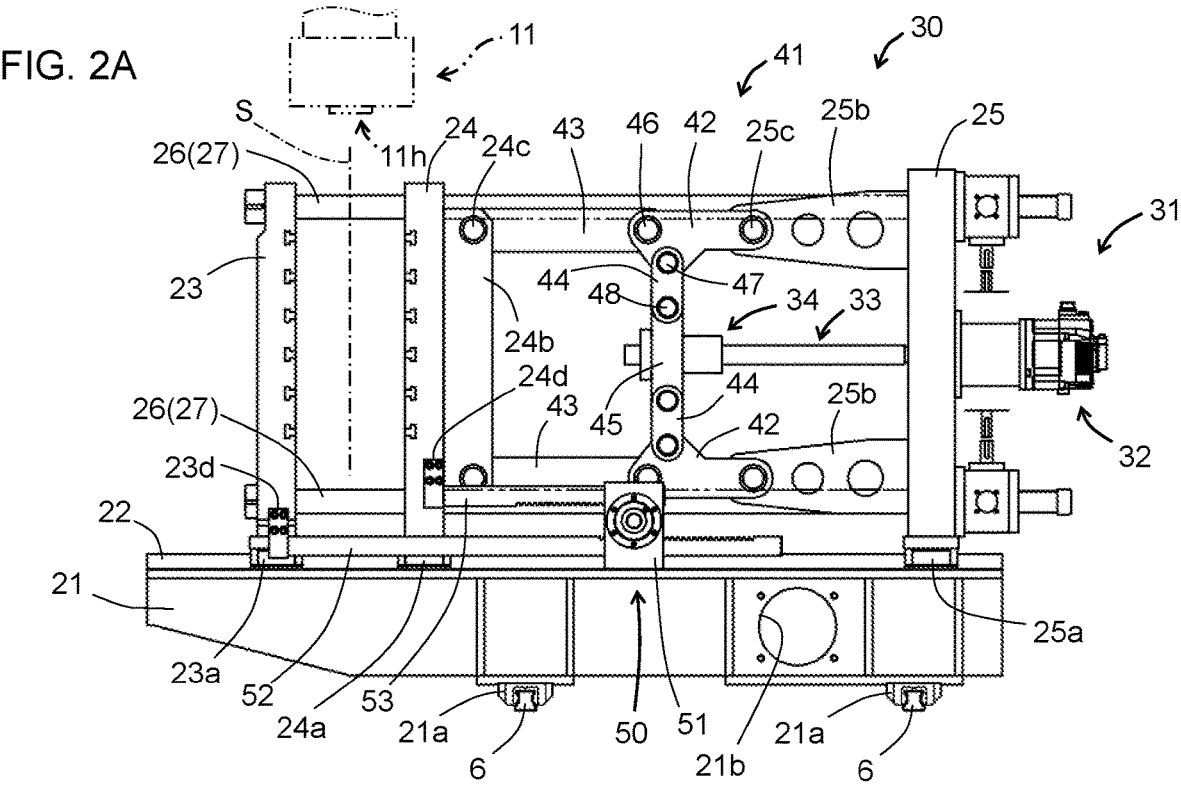
FIG. 2A is a side view of the configuration of the molding apparatus 1 of FIG. 1 excluding an electric cylinder 6.
Figure 2B:
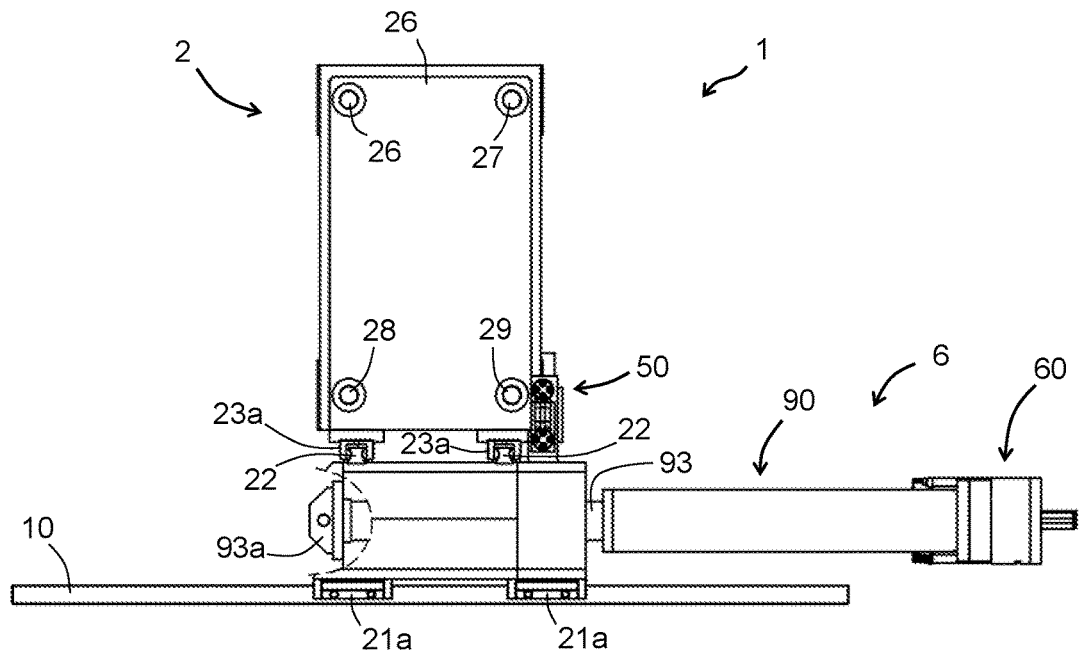
FIG. 2B is a front view of the molding apparatus 1 of FIG. 1.

As shown in FIGS. 1, 2A and 2B, the mold clamping device 2 comprises a movable base 21, a mold clamping rails 22, a first to third platens 23 to 25, four tie bars (tie bars 26 to 29), a clamping drive unit 30, and a clamping reference plane holding unit 50.

As shown in FIGS. 2A and 2B, a pair of guide blocks 21a are attached to the lower surface of the movable base 21 at two locations in the longitudinal direction of the transfer rails 10, for a total of four locations. The movable base 21 is guided along the transfer rails 10 by moving the guide blocks 21a on the pair of transfer rails 10. Further, on the upper surface of the movable base 21, two mold clamping rails 22 that support the first to third platens 23 to 25 so as to be horizontally movable are arranged in parallel in the mold clamping direction (left-right direction in FIG. 2A). In addition, a pinion holding member 51 of the clamping reference plane holding unit 50, which will be described later, is fixed to the upper surface of the movable base 21.

Figure 3A:
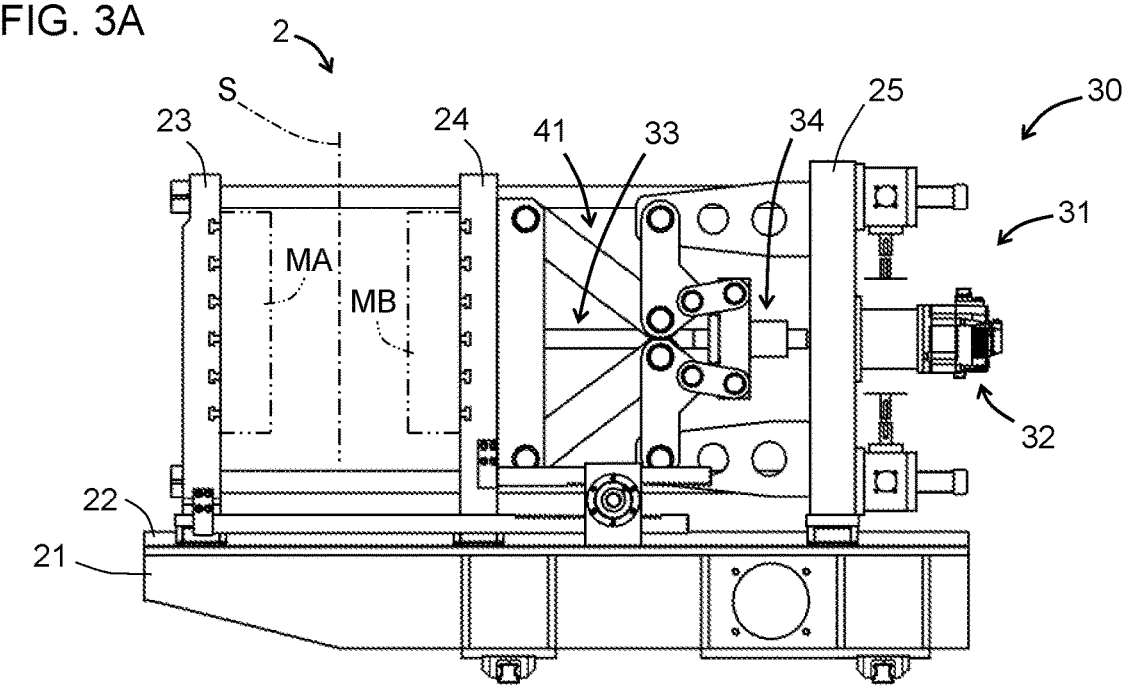
FIG. 3A is an explanatory views showing the operation of a mold clamping device 2 of the molding apparatus 1 of FIG. 1.
Figure 3B:
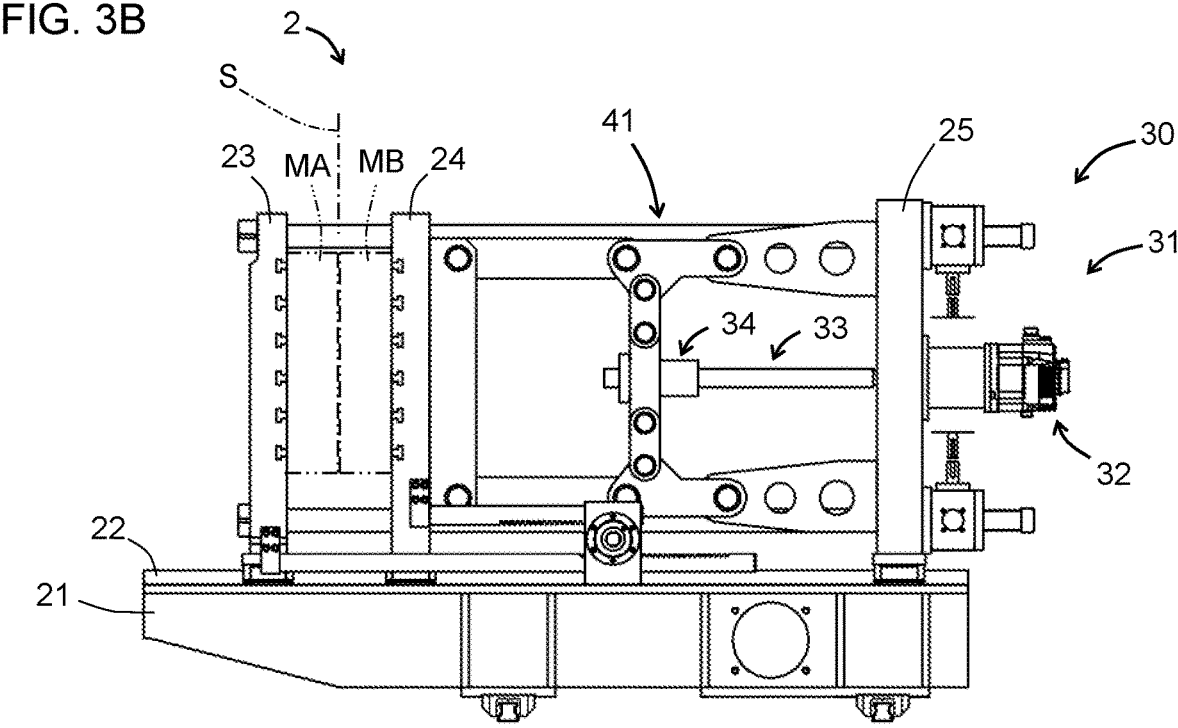
FIG. 3B is an explanatory view showing the operation of a mold clamping device 2 of the molding apparatus 1 of FIG. 1.

As shown in FIG. 2A, the first to third platens 23 to 25 are arranged on the pair of mold clamping rails 22 in this order. A pair of guide blocks 23a to 25a are attached to the lower surfaces of the first to third platens 23 to 25, respectively. The first to third platens 23 to 25 are guided along the mold clamping rails 22 by the guide blocks 23a to 25a moving on the pair of transfer rails 10. That is, the first to third platens 23 to 25 are movable. As shown in FIGS. 3A and 3B, the first platen 23 holds the split die MA, and the second platen 24 holds the split die MB.

As shown in FIGS. 2A and 2B, tie bars 26 to 29 are inserted into the corners of the first to third platens 23 to 25 in a quadrangular arrangement in parallel with the mold clamping rails 22. In FIG. 2A, a part of the tie bars 27 and 29 are drawn by imaginary lines. One end sides of the tie bars 26 to 29 (the left end sides in FIG. 2A) are fixed to the first platen 23, and the other end sides of the tie bars 26 to 29 (the right end sides in FIG. 2A) are fixed to the third platen 25. As a result, the first and third platens 23 and 25 move in conjunction with each other. Further, the second platen 24 is arranged between the first and third platens 23 and 25, and slides along the tie bars 26 to 29.

As shown in FIGS. 3A and 3B, the clamping drive unit 30 is used to drive the first and second platens 23 and 24 closer to or separated from each other. As shown in FIG. 2A, the clamping drive unit 30 comprises a slide drive means 31 and a toggle mechanism 41.

The slide drive means 31 comprises a clamping servomotor 32, a ball screw 33, and a ball nut 34. The clamping servomotor 32 is fixed to the third platen 25. The ball screw 33 is arranged parallel to the mold clamping rails 22. The slide drive means 31 is configured such that the ball nut 34 moves along the ball screw 33 by rotating the ball screw 33 by driving the clamping servomotor 32.

The toggle mechanism 41 is configured such that the second and third platens 24 and 25 are connected by links, and the second and third platens 24 and 25 drives closer to or separated from each other by the drive of the slide drive means 31. Specifically, as shown in FIG. 2A, the toggle mechanism 41 comprises a pair of upper and lower first toggle links 42, a pair of upper and lower second toggle links 43, a pair of upper and lower auxiliary links 44, and a connecting member 45. In the present embodiment, the pair of first toggle links 42, the pair of second toggle links 43, and the pair of auxiliary links 44 are each provided with two sets in the direction perpendicular to the mold clamping direction (depth direction in FIG. 2A) (See FIG. 1). However, since they have the same configuration and have the same functions, only one set will be described below.

One end side of the first toggle link 42 is rotatably connected to the third platen 25 via a bracket 25b and a pin 25c. Here, the bracket 25b extends longer in the longitudinal direction than the length in the longitudinal direction of the first toggle link 42 and is connected to the first toggle link 42 via the pin 25c at its end. The other end side of the first toggle link 42 is rotatably connected to one end side of the second toggle link 43 via a pin 46. The other end of the second toggle link 43 is rotatably connected to the second platen 24 via a bracket 24b and a pin 24c. Further, one end side of the auxiliary link 44 is rotatably connected to the first toggle link 42 via a pin 47, and the other end side of the auxiliary link 44 is rotatably connected to the connecting member 45 via a pin 48.

The connecting member 45 holds the ball nut 34 of the slide drive means 31. As a result, the connecting member 45 moves in the direction along the mold clamping rails 22 as the ball nut 34 moves due to the rotation of the ball screw 33.

As shown in FIGS. 4A and 4B, the clamping reference plane holding unit 50 comprises a pinion holding member 51, a pinion 52, and first and second racks 53 and 54. The pinion holding member 51 is fixed to the upper surface of the movable base 21 and rotatably supports the pinion 52 about a rotation axis perpendicular to the mold clamping direction. The pinion 52 is arranged so as to mesh with the teeth 53a of the first rack 53 and the teeth 54a of the second rack 54 at a position between the first and second racks 53 and 54 arranged parallel to the mold clamping rails 22, respectively. The first rack 53 is fixed to the first platen 23 via the fixing member 23d, and the second rack 54 is fixed to the second platen 24 via the fixing member 24d. The pinion 52, the first rack 53, and the second rack 54 constitute a rack and pinion mechanism.

Since the first and second platens 23 and 24 are connected to the pinion 52 via the first and second racks 53 and 54, respectively, the first and second platens 23 and 24 move in opposite directions by an equal distance according to the rotation of the pinion 52. With such a configuration, the clamping reference plane holding unit 50 functions to symmetrically move the first and second platens 23 and 24 with respect to the clamping reference plane S (center position when the die is clamped) of the dies MA and MB also shown in FIGS. 3A and 3B.

Hereinafter, the operation of the mold clamping device 2 having the above configuration will be described with reference to FIGS. 3A and 3B. When "the clamping servomotor 32" of the slide drive means 31 drives from the state where the dies MA and MB are open in FIG. 3A, the ball screw 33 rotates and the ball nut 34 and the connecting member 45 move away from the third platen 25 (to the left in FIG. 3A). Then, the pair of auxiliary links 44, the pair of first toggle links 42, and the pair of second toggle links 43 move in conjunction with each other, and the distance between the second platen 24 and the third platen 25 increases. At the same time, the distance between the first platen 23 and the second platen 24 becomes closer.

Then, when the connecting member 45 is further driven by the clamping servomotor 32, the bracket 25b of the third platen 25, the first toggle link 42, and the second toggle link 43 are aligned in a straight line as shown in FIG. 3B. Then, in this state, the split die MA held on the first platen 23 and the split die MB held on the second platen 24 are clamped.

By the way, during the above operation, the first to third platens 23 to 25 are all in a state of being movable on the mold clamping rails 22. However, since the mold clamping device 2 of the present embodiment comprises the clamping reference plane holding unit 50, the movements of the first and second platens 23 and 24 are restricted, and the first and second platens 23 and 24 are kept equidistant with respect to the clamping reference plane S. Therefore, by aligning the position directly below the extruder 11 and the clamping reference plane S (see FIG. 2A), the parison dropping from the extruder 11 can be clamped without misalignment. Then, by blowing air into the parison in this state, it is possible to obtain a molded body that conforms to the shape of the cavity engraved on the inner surface of the die.

On the other hand, when the clamping servomotor 32 is rotated in the reverse direction from the state of FIG. 3B, the first and second platens 23 and 24 move away from each other, and the die can be opened.

As described above, the mold clamping device 2 of the present embodiment is configured to clamp when the first toggle link 42 and the second toggle link 43 are aligned in a straight line. Therefore, the mold clamping device 2 can significantly increase the fastening force at the time of clamping. Further, since the mold clamping device 2 of the present embodiment is provided with two sets of a pair of first toggle links 42, a pair of second toggle links 43, and a pair of auxiliary links 44. Therefore, the fastening force and the accuracy are further increased.

Electric Cylinder 6

Figure 5A:
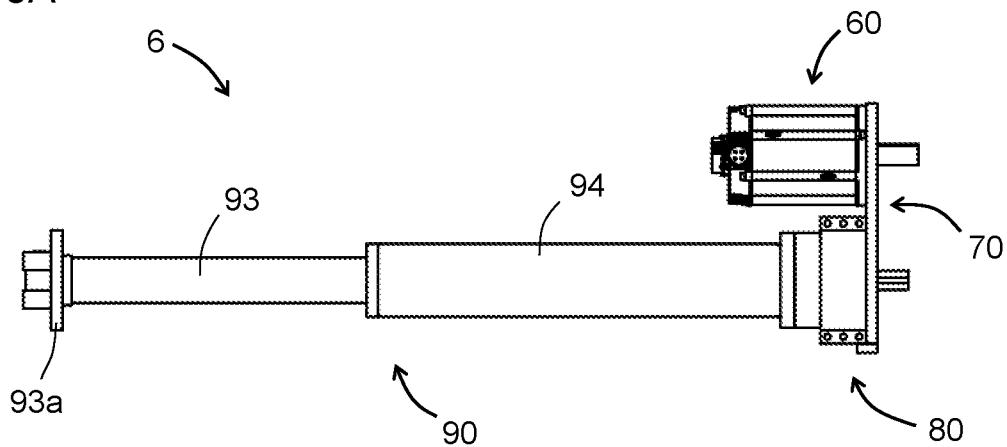
FIG. 5A is a plan views showing the electric cylinder 6 of the molding apparatus 1 of FIG. 1.
Figure 5B:
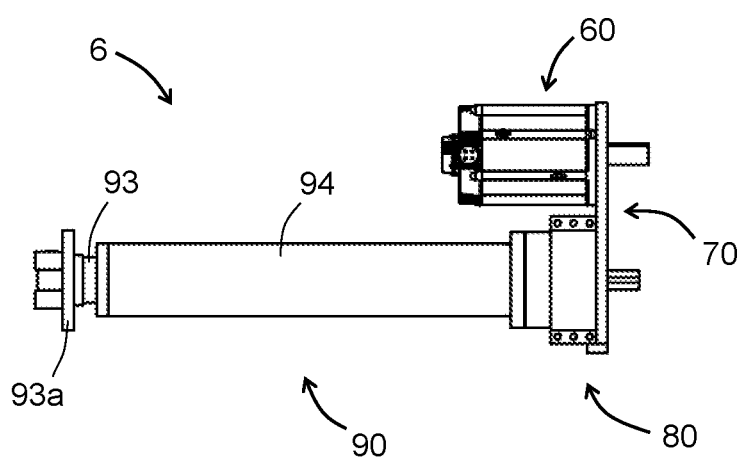
FIG. 5B is a plan view showing the electric cylinder 6 of the molding apparatus 1 of FIG. 1.
Figure 6:
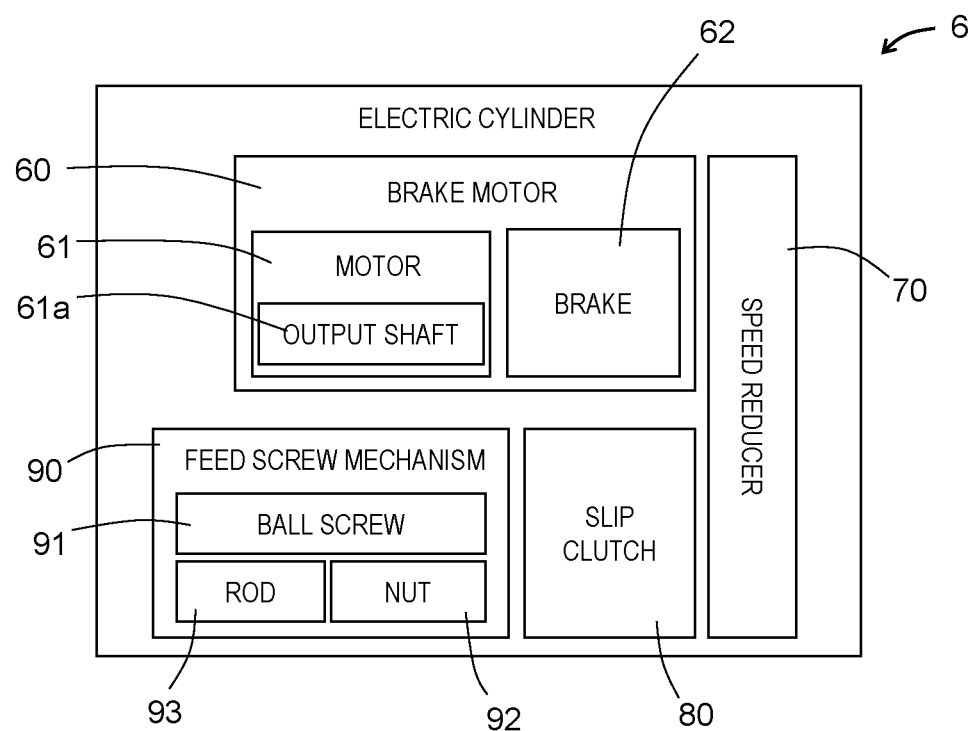
FIG. 6 is a block diagram showing a configuration of the electric cylinder 6 of FIGS. 5A and 5B.

As shown in FIGS. 5A, 5B and 6, the electric cylinder 6 comprises a brake motor 60, a speed reducer 70, a slip clutch 80 as a clutch, and a ball screw mechanism 90 as a feed screw mechanism. The electric cylinder 6 is used for attaching/detaching and maintaining the dies MA and MB of the mold clamping device 2, and for continuous operation of the molding apparatus 1 described later.

As shown in FIG. 6, the brake motor 60 comprises a motor 61 having an output shaft 61a and a brake 62. In the present embodiment, the brake 62 is a spring close type of non-excited electromagnetic brake that generates a braking force by a spring. Specifically, the brake 62 comprises a coil, an armature, a disc, a plate, and a spring (these are not shown), and when the power is off or a power failure occurs, the brake 62 presses the armature with a spring and generates a braking force by sandwiching the disc between the armature and the plate to brake the rotation of the output shaft 61a. The brake motor 60 may have a configuration in which the motor 61 and the brake 62 are integrated or may be individually arranged without being integrated. Further, the brake 62 can be a permanent close type of non-excited electromagnetic brake that generates a braking force by a permanent magnet.

The speed reducer 70 decelerates the rotation of the brake motor 60 and transmits the rotation to the slip clutch 80.

The slip clutch 80 is used as a back torque limiter. Specifically, the slip clutch 80 of the present embodiment has a main drive shaft connected to the output shaft 61a of the motor 61 via the speed reducer 70 and a driven shaft connected to the ball screw 91 of the ball screw mechanism 90 (not shown). The slip clutch 80 transmits power by connecting the output shaft 61a and the ball screw 91 by rotating the main drive shaft and the driven shaft in conjunction with each other with respect to the power in the forward direction. Here, the forward direction is the direction from the output shaft 61a side of the motor 61 to the ball screw 91 side of the ball screw mechanism 90. On the other hand, when an excessive torque (back torque) is applied in the opposite direction, i.e., the direction from the ball screw 91 side to the output shaft 61a side, the connection between the output shaft 61a and the ball screw 91 can be loosened by loosening the connection between the main drive shaft and the driven shaft (by becoming a half-clutch state). As the slip clutch 80, a known structure can be used.

The ball screw mechanism 90 is used to convert a rotary motion into a linear motion. As shown in FIG. 6, the ball screw mechanism 90 comprises a ball screw 91, a nut 92, a rod 93, and an outer cylinder 94 (see FIGS. 5A and 5B) that covers the ball screw 91 and the nut 92. Further, a plurality of balls that circulate infinitely are arranged between the ball screw 91 and the nut 92 and can be driven with a slight frictional resistance. As for the configuration of the ball screw mechanism 90, a known configuration can be used. It is also possible to use a feed screw mechanism that does not use a ball instead of the ball screw mechanism 90.

As described above, the ball screw 91 of the present embodiment is connected to the motor 61 via the slip clutch 80 and the speed reducer 70 and is rotated by the drive of the motor 61. The nut 92 moves in the longitudinal direction of the ball screw 91 as the ball screw 91 rotates. A rod 93 is attached to the nut 92, and as shown in FIGS. 5A and 5B, the rod 93 telescopically moves with respect to the outer cylinder 94 as the nut 92 moves. Further, a fixing portion 93a is provided at the tip of the rod 93. As shown in FIGS. 1 and 2B, the fixing portion 93a of the present embodiment penetrates through the through hole 21b (see FIG. 2A) provided in the movable base 21 of the mold clamping device 2 and is fixed to the movable base 21 at the position opposite to the electric cylinder 6. According to such a fixing state, the electric cylinder 6 can be installed at a position closer to the mold clamping device 2 as compared with the case where the fixing portion 93a is fixed to the position on the electric cylinder 6 side of the movable base 21. Therefore, it is possible to reduce the installation area of the molding apparatus 1.

Hereinafter, the operation of the electric cylinder 6 having the above configuration will be described with reference to FIGS. 7A to 8B.

Figure 7A:
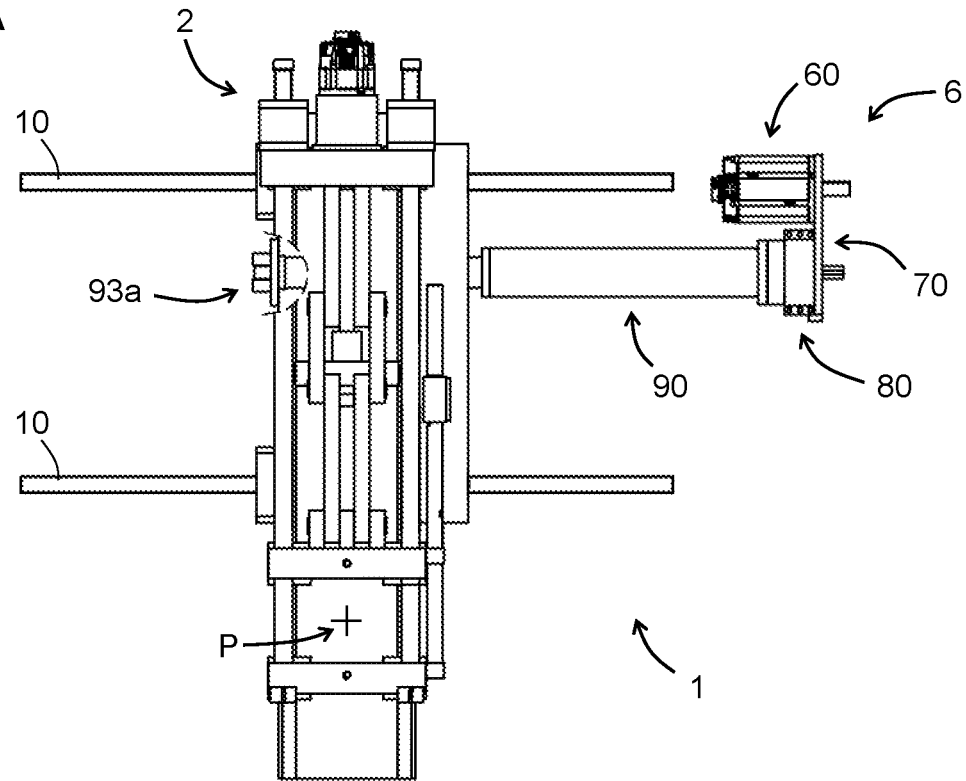
FIG. 7A is an explanatory views showing how the mold clamping device 2 is transferred by the electric cylinder 6 of FIG. 5A.
Figure 8A:
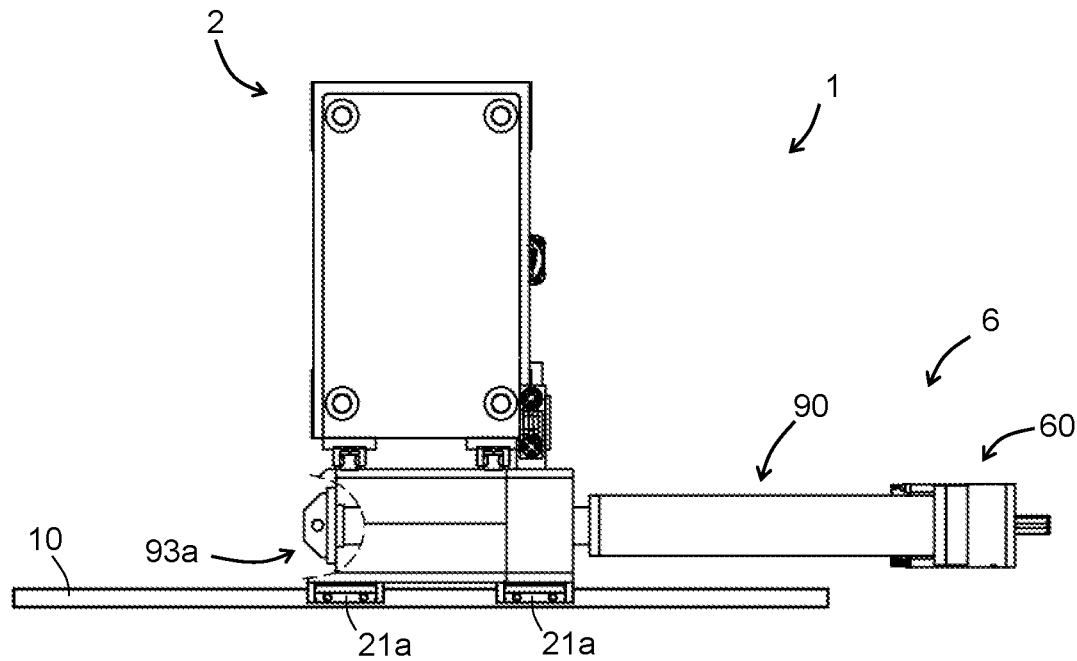
FIG. 8A is an explanatory views showing how the mold clamping device 2 is transferred by the electric cylinder 6 of FIG. 5A from another angle.

FIGS. 7A and 8A show the state of the electric cylinder 6 when the mold clamping device 2 of the present embodiment performs mold clamping. Point P in FIG. 7A is the drop point of the parison dropping from the head 11h (see FIG. 2A) of the extruder 11. In this state, the mold clamping device 2 clamps the parison. When the mold clamping device 2 is in the position of clamping, the ball screw mechanism 90 of the electric cylinder 6 is in a state in which the rod 93 is extended.

When the motor 61 of the electric cylinder 6 is driven from the state of FIGS. 7A and 8A, the ball screw 91 of the ball screw mechanism 90 rotates via the speed reducer 70 and the slip clutch 80. The nut 92 moves with the rotation of the ball screw 91 and the rod 93 contracts to transfer the mold clamping device 2. Here, the slip clutch 80 is configured so that the main drive shaft and the driven shaft are securely connected and interlocked to rotate to transmit power when the mold clamping device 2 is accelerated by the electric cylinder 6. Further, the output of the motor 61 is lowered and the brake 62 is operated when decelerating the mold clamping device 2.

Figure 7B:
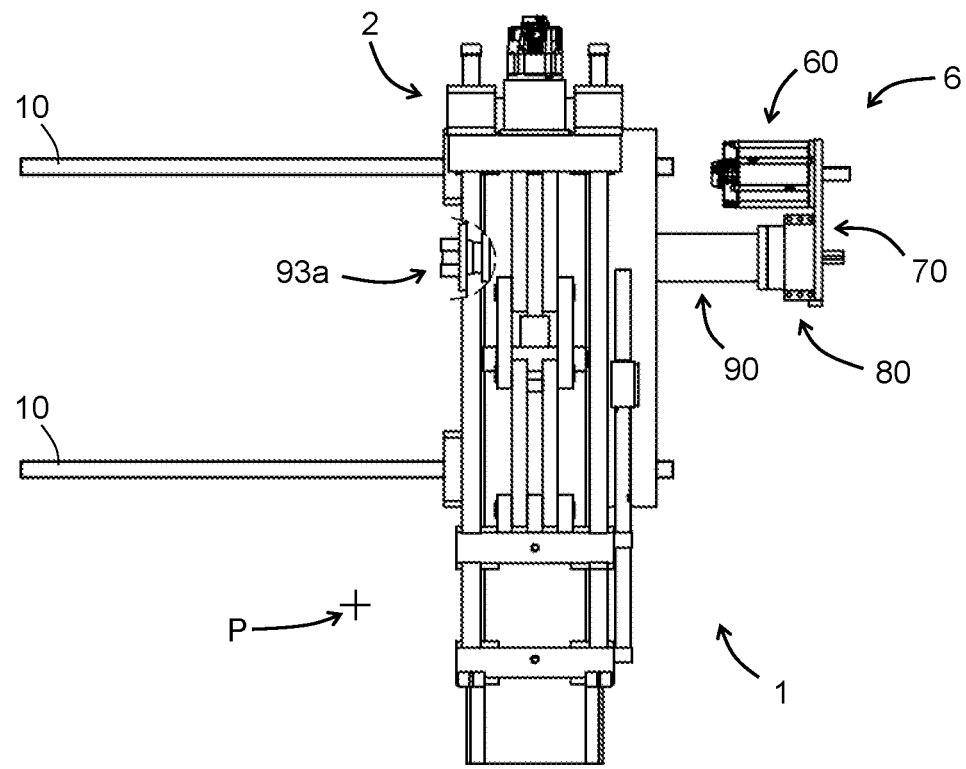
FIG. 7B is an explanatory view showing how the mold clamping device 2 is transferred by the electric cylinder 6 of FIG. 5B.
Figure 8B:
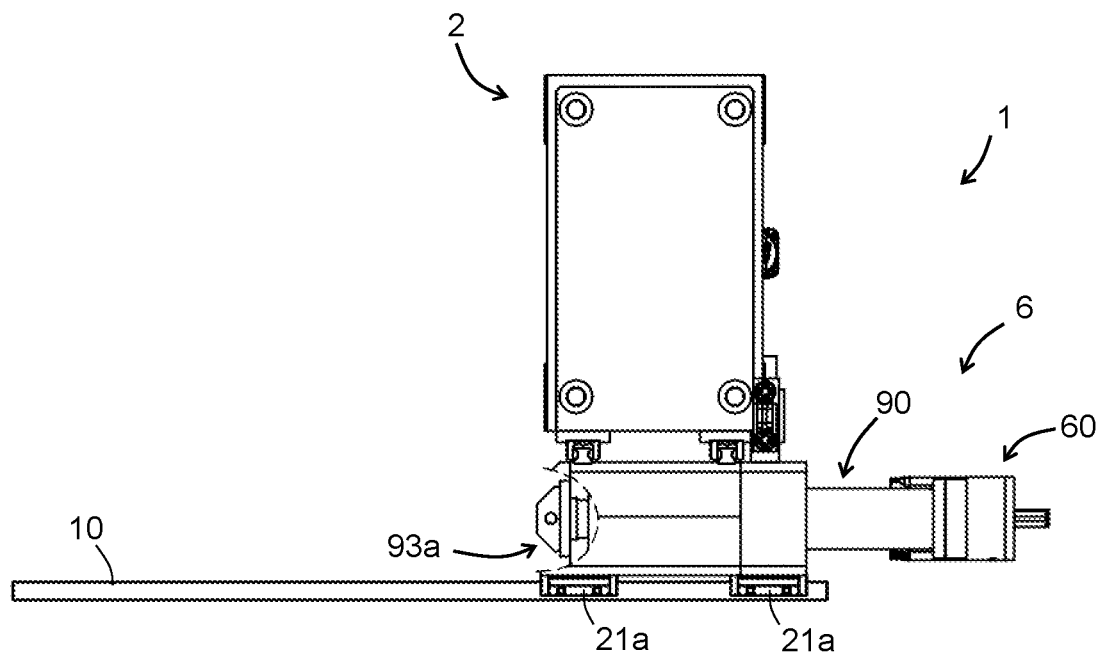
FIG. 8B is an explanatory view showing how the mold clamping device 2 is transferred by the electric cylinder 6 of FIG. 5B from another angle.

Then, when the rod 93 contracts and substantially the entire rod 93 is housed in the outer cylinder 94 and reaches the state shown in FIGS. 7B and 8B, the transfer operation is completed. By driving the motor 61 in the opposite direction from the states shown in FIGS. 7B and 8B, it is possible to return to the states shown in FIGS. 7A and 8A again. As described above, the mold clamping device 2 of the present embodiment is transferred on the transfer rails 10 by the telescopic motion of the rod 93 of the electric cylinder 6.

Deburring Device 500

Figure 9A:
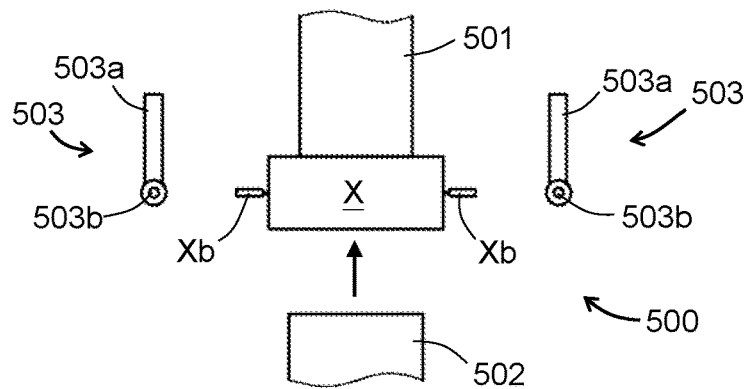
FIG. 9A is an explanatory views schematically showing an operation of one viewpoint of a deburring device 500 included in the molding apparatus 1 of FIG. 1.

Burrs Xb are attached to the molded body X that has been molded by the mold clamping device 2 of the present embodiment and taken out by opening the die (see FIG. 9A). The molding apparatus 1 of the present embodiment comprises the deburring device 500 shown in FIGS. 9A to 9D to remove the burrs Xb. The deburring device 500 comprises a robot arm 501, a support member 502, and a pair of swing members 503. Hereinafter, the operation of the deburring device 500 will be briefly described.

Figure 9B:
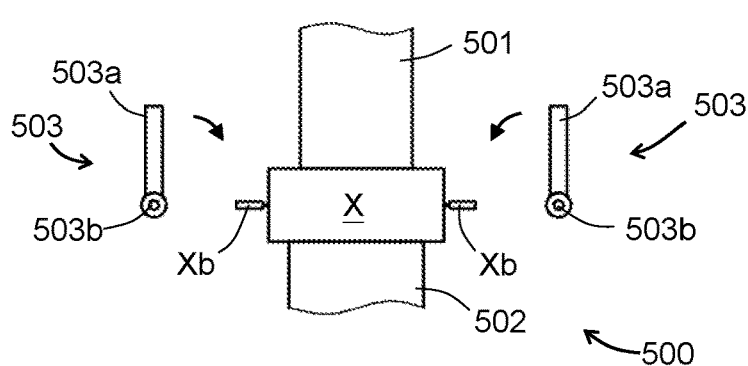
FIG. 9B is an explanatory view schematically showing an operation of one viewpoint of a deburring device 500 included in the molding apparatus 1 of FIG. 1.
Figure 9C:
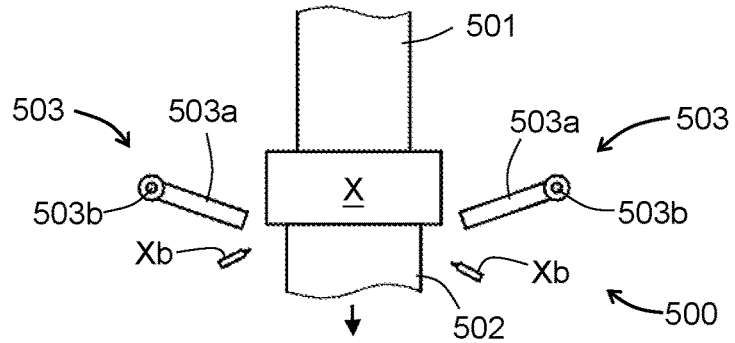
FIG. 9C is an explanatory view schematically showing an operation of one viewpoint of a deburring device 500 included in the molding apparatus 1 of FIG. 1.
Figure 9D:
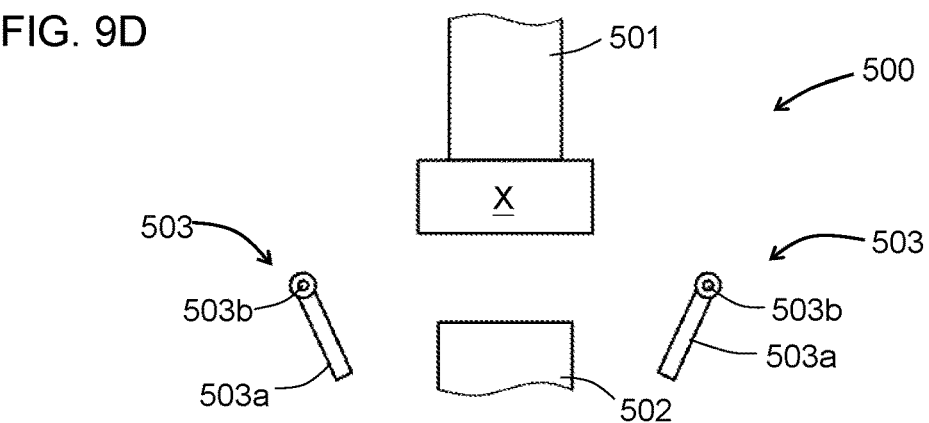
FIG. 9D is an explanatory view schematically showing an operation of one viewpoint of a deburring device 500 included in the molding apparatus 1 of FIG. 1.

In the deburring operation of the deburring device 500, first, as shown in FIG. 9A, the molded body X is sucked and held by the robot arm 501. Next, as shown in FIG. 9B, the lower portion of the molded body X is supported by the support member 502. Next, as shown in FIG. 9C, the arms 503a of the swing members 503 are rotated around rotating shafts 503b arranged at a height position substantially equal to that of the burrs Xb, and the burrs Xb are beaten off by the arms 503a. Finally, as shown in FIG. 9D, the support by the support member 502 is released, the molded body X is conveyed to a predetermined position by the robot arm 501, and the deburring operation is completed.

By the way, in order to remove the burrs Xb of the molded body X by the deburring device 500, it is preferable to pinch off with a strong mold clamping force at the time of mold clamping. In this respect, since the mold clamping device 2 of the present embodiment comprises the toggle mechanism 41 described above, it is possible to perform mold clamping with a sufficient mold clamping force.

Instead, as a result of adopting the toggle mechanism 41 described above in order to increase the mold clamping force, the clamping drive unit 30 becomes heavier in the mold clamping device 2 of the present embodiment, and the mold clamping device 2 itself is also heavier than the conventional one. Therefore, when such a heavy mold clamping device 2 is transferred by the electric cylinder 6, the moment of inertia becomes large and the load on the motor 61 increases, particularly during acceleration/deceleration.

However, in this respect, since the electric cylinder 6 of the present embodiment uses the brake motor 60, the load on the motor 61 can be reduced by braking with the brake 62, particularly when the mold clamping device 2 is decelerating. In addition, the electric cylinder 6 of the present embodiment comprises the slip clutch 80. As a result, when an excessive torque (back torque) is applied from the ball screw 91 side to the output shaft 61a side due to the inertial force of the mold clamping device 2, the connection between the output shaft 61a and the ball screw 91 is loosened (blocked). This also makes it possible to reduce the load on the motor 61.

Figure 10:
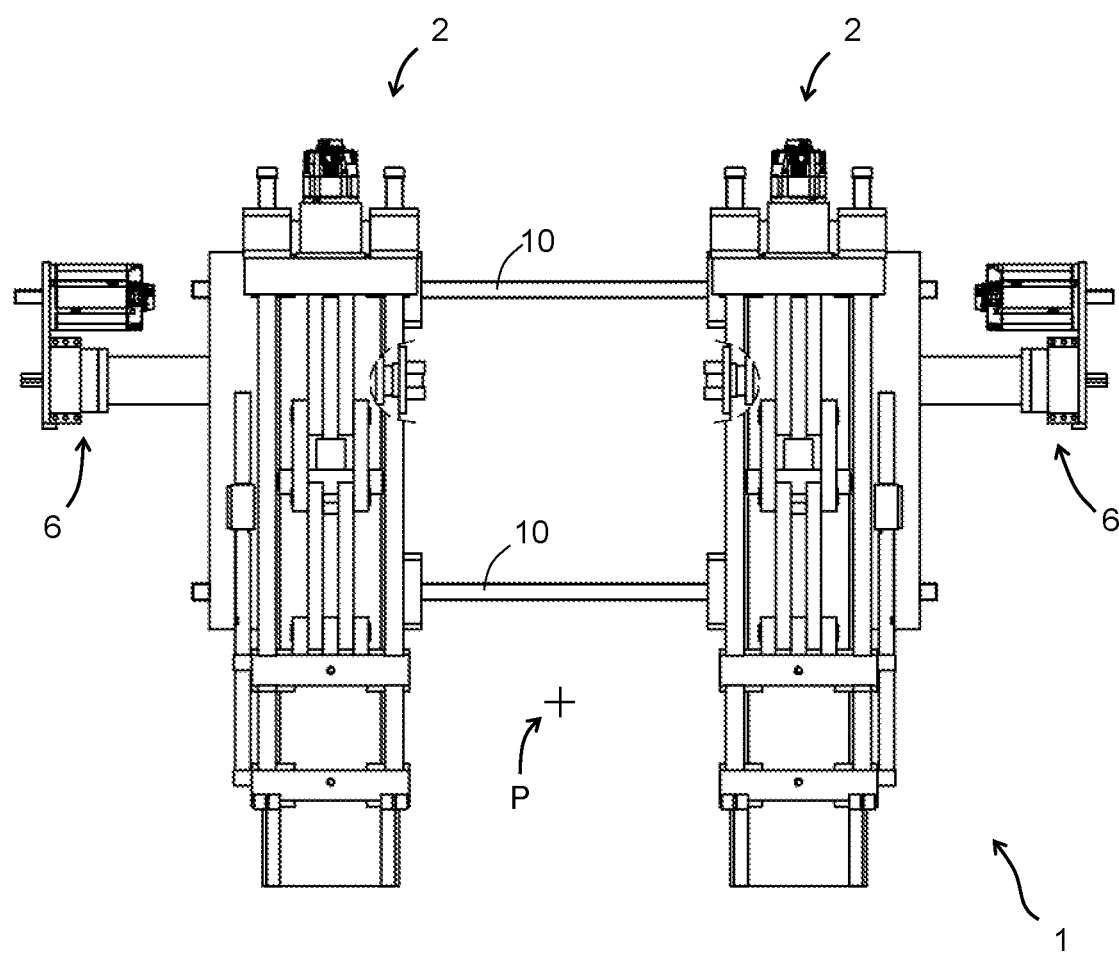
FIG. 10 is a plan view showing a state in which a plurality of molding apparatuses 1 according to the first embodiment of the first viewpoint of the present invention are arranged.

It is assumed as the usage pattern of the molding apparatus 1 that a parison is continuously supplied from one extruder 11, and a plurality of mold clamping devices 2 are transferred and used alternately to continuously perform the mold clamping. For example, FIG. 10 shows an example in which two mold clamping devices 2 and two electric cylinders 6 corresponding thereto are arranged line-symmetrically, and two mold clamping devices 2 are arranged on a pair of transfer rails 10. In this case, each electric cylinder 6 alternately moves the centers of the dies attached to the two mold clamping devices 2 to the drop point P of the parison, so that the mold clamping can be continuously performed. When the molding apparatus 1 has such a configuration, it is required to transfer the mold clamping device 2 at high speed. In this respect, in the molding apparatus 1 of the present invention, the electric cylinder 6 is used as the transfer means of the mold clamping device 2, and the electric cylinder 6 comprises the brake motor 60 and the slip clutch 80. Therefore, the electric cylinder 6 can prevent the motor 61 from being overloaded even if sudden acceleration/deceleration is performed for high-speed transfer.

Variation

Figure 11A:
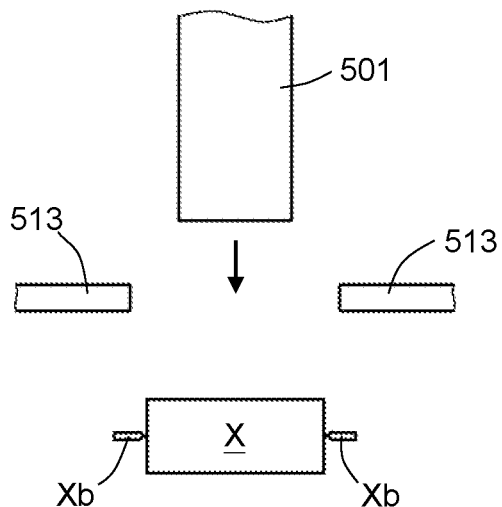
FIG. 11A is an explanatory views schematically showing the operation of a modification of the deburring device 500 included in the molding apparatus 1 of FIG. 1.
Figure 11B:
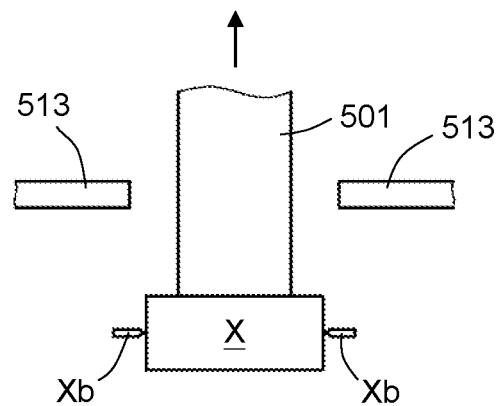
FIG. 11B is an explanatory view schematically showing the operation of a modification of the deburring device 500 included in the molding apparatus 1 of FIG. 1.
Figure 11C:
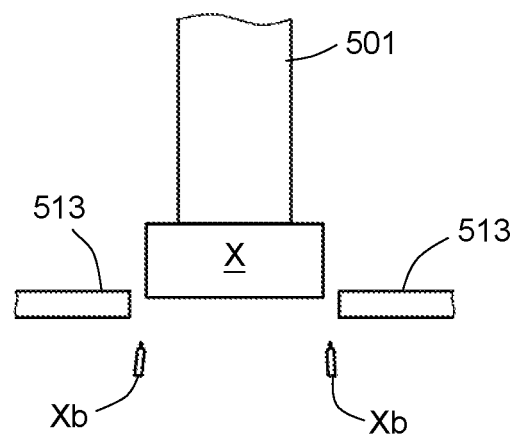
FIG. 11C is an explanatory view schematically showing the operation of a modification of the deburring device 500 included in the molding apparatus 1 of FIG. 1.
Figure 12A:
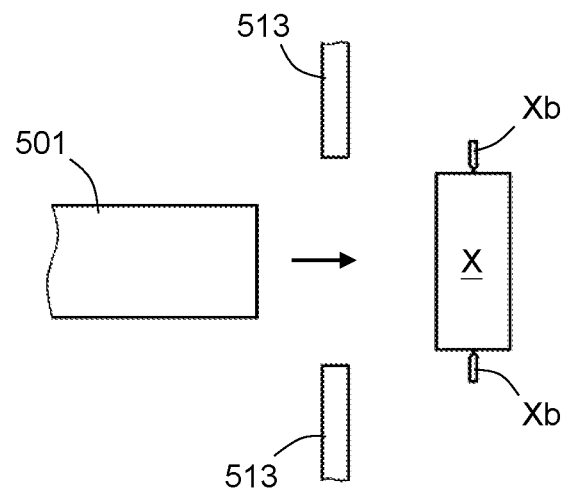
FIG. 12A is an explanatory views schematically showing the operation of another modification of the deburring device 500 included in the molding apparatus 1 of FIG. 1.
Figure 12B:
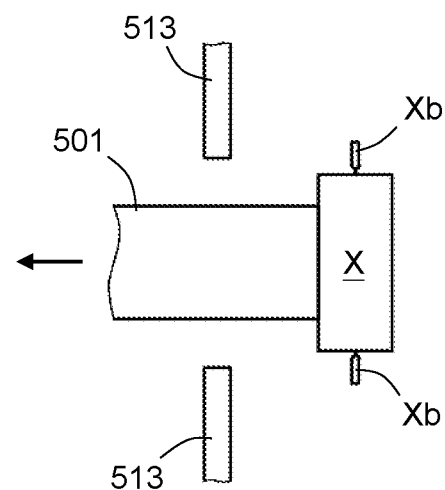
FIG. 12B is an explanatory view schematically showing the operation of another modification of the deburring device 500 included in the molding apparatus 1 of FIG. 1.
Figure 12C:
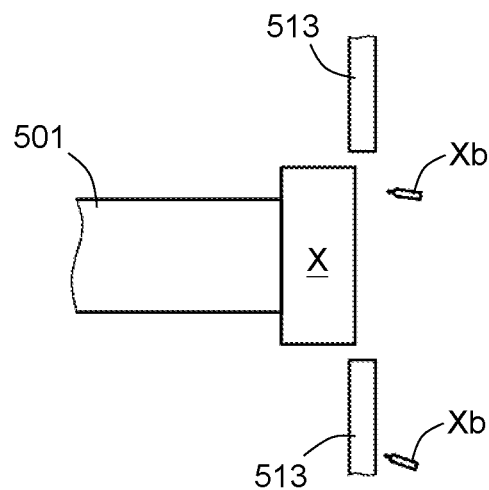
FIG. 12C is an explanatory view schematically showing the operation of another modification of the deburring device 500 included in the molding apparatus 1 of FIG. 1.

The present invention can also be implemented in the following embodiments:

In the above embodiment, the deburring device 500 of the molding apparatus 1 has a configuration using the swing members 503 shown in FIGS. 9A to 9D. However, as shown in FIGS. 11A to 11C, the deburring device 500 can also be configured by the robot arm 501 and a pair of removal pieces 513 so that the burrs Xb are hooked on the removal pieces 513 to remove the burrs Xb. Further, as shown in FIGS. 12A to 12C, the deburring device 500 can also be configured such that the molded body X is horizontally moved by the robot arm 501 and the burrs Xb are hooked on the pair of removal pieces 513 arranged vertically. In either case, the removed burr Xb will fall in the direction opposite to the moving direction of the robot arm 501.

In the above embodiment, the slide drive means 31 of the clamping drive unit 30 of the mold clamping device 2 is driven by the clamping servomotor 32. However, a hydraulic type or a rack and pinion type may be used. Further, the configuration of the toggle mechanism 41 of the clamping drive unit 30 is not limited to that of the above embodiment. For example, in the above embodiment, the components such as the first and second toggle links 42 and 43 of the toggle mechanism 41 are provided with two sets. However, it is also possible to have a configuration in which only one component is provided. Furthermore, in the above embodiment, the toggle links 42 and 43 are configured to operate within a plane perpendicular to the horizontal plane. However, the toggle links 42 and 43 may be configured to operate within a plane parallel to the mold clamping direction, and may be configured to operate in a horizontal plane, for example. Any configuration can be used for the toggle mechanism 41 and the clamping drive unit 30 including the toggle mechanism 41 as long as the clamping force by the mold clamping can be obtained.

In the above embodiment, the brake 62 of the brake motor 60 of the electric cylinder 6 is a spring closed type, that is, a non-excited type. However, an excited type brake may be used as the brake 62.

In the above embodiment, the electric cylinder 6 comprises both the brake motor 60 and the slip clutch 80. However, the molding apparatus 1 of the present invention may have a configuration in which the electric cylinder 6 comprises only one of the brake motor 60 and the slip clutch 80. If either the brake motor 60 or the slip clutch 80 is provided, it is possible to reduce the load on the motor 61 when the mold clamping device 2 is transferred (particularly during acceleration/deceleration).

In the above embodiment, the electric cylinder 6 includes a slip clutch 80 as a clutch, but the present invention is not limited to this. That is, if the load (torque) on the motor 61 is reduced, it is possible to use another clutch such as an electromagnetic clutch as the clutch.

Embodiment of Second Viewpoint

1. First Embodiment of the Second Viewpoint

Figure 13:
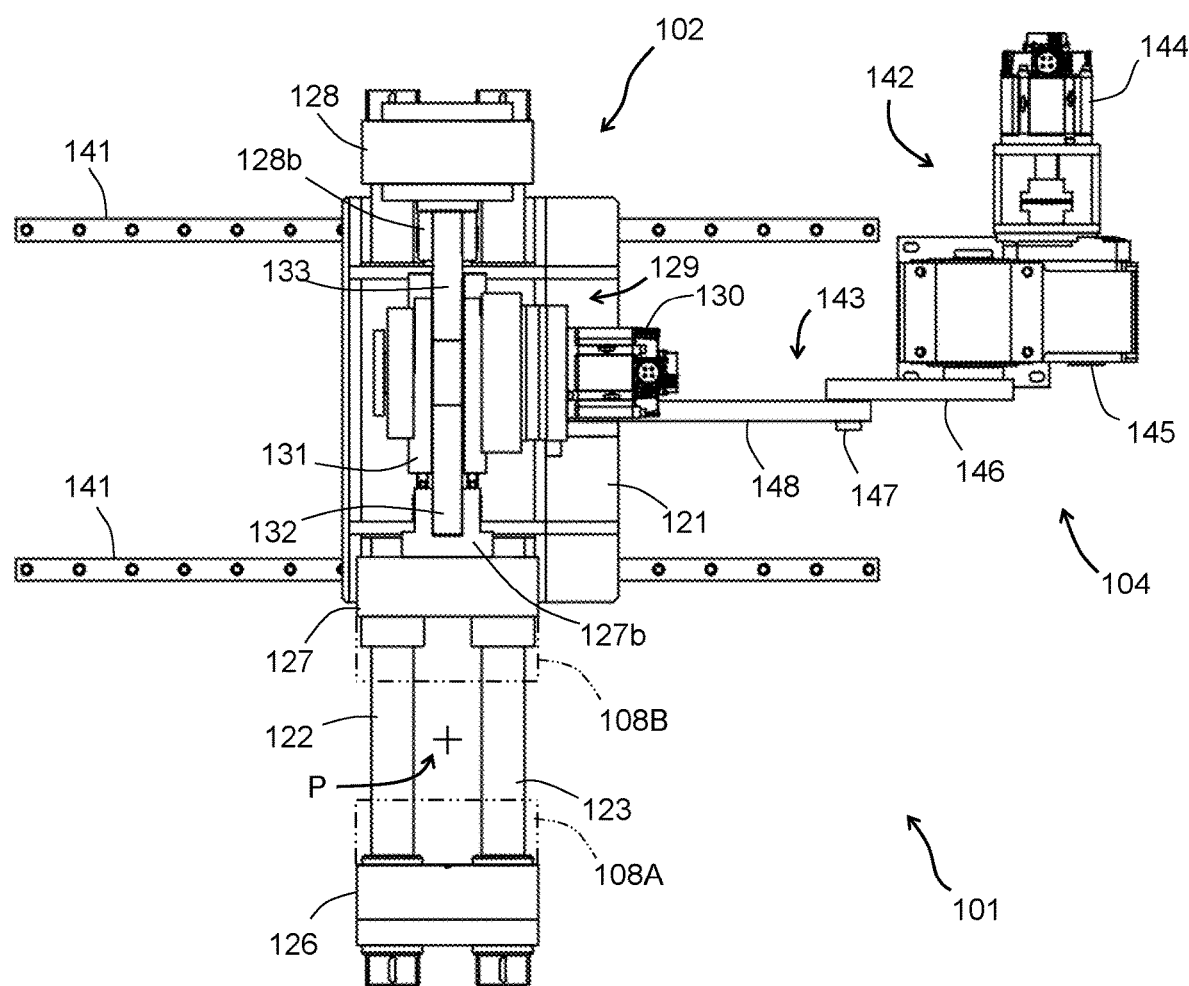
FIG. 13 is a plan view showing a molding apparatus 101 according to a first embodiment of a second viewpoint of the present invention.

As shown in FIG. 13, the molding apparatus 101 according to the first embodiment of the second viewpoint of the present invention comprises a mold clamping device 102, a transfer means 104, and transfer rails 141. The mold clamping device 102 is a device for clamping a cylindrical parison supplied from an extruder 107 (see FIG. 14A) and blowing air to obtain a molded body. The mold clamping device 102 is mounted on the transfer rails 141 included in the transfer means 104. The transfer means 104 is a means for transferring the mold clamping device 102 along the transfer rails 141. Hereinafter, the configurations and operations of the mold clamping device 102 and the transfer means 104 will be described.

Mold Clamping Device 102

Figure 14A:
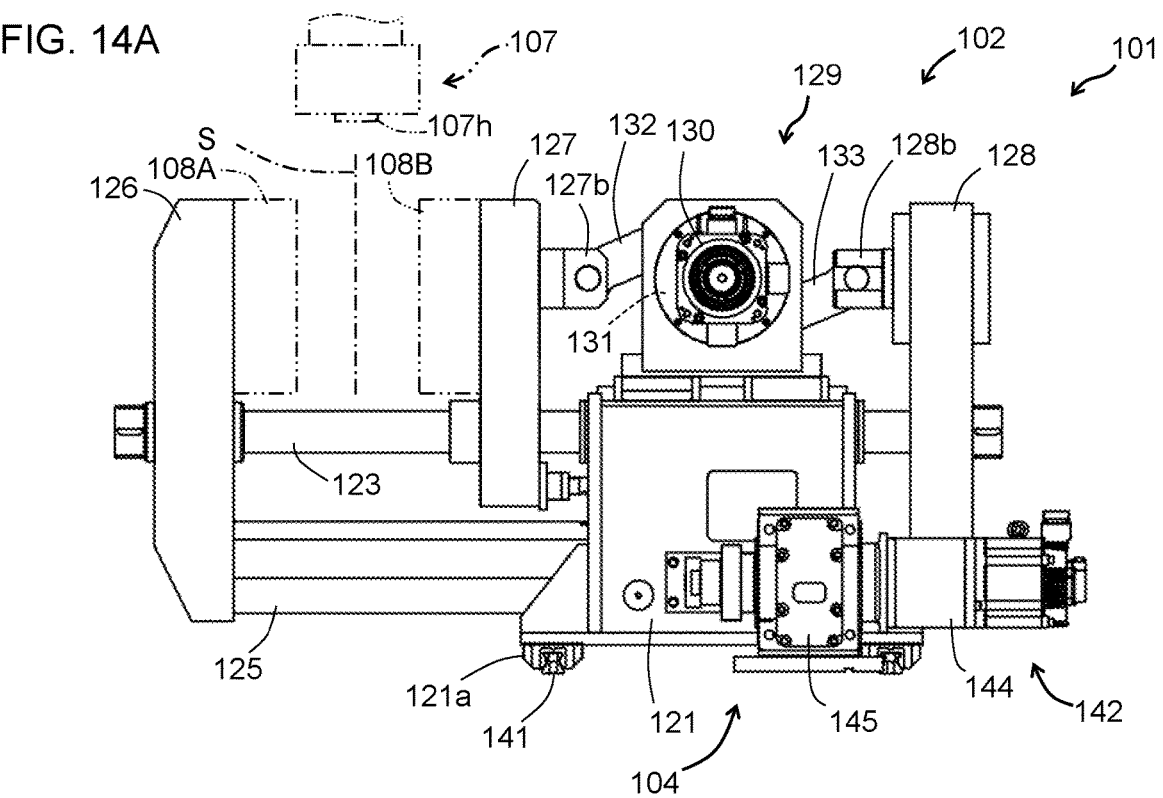
FIG. 14A is a side view of the molding apparatus 101 of FIG. 13.
Figure 14B:
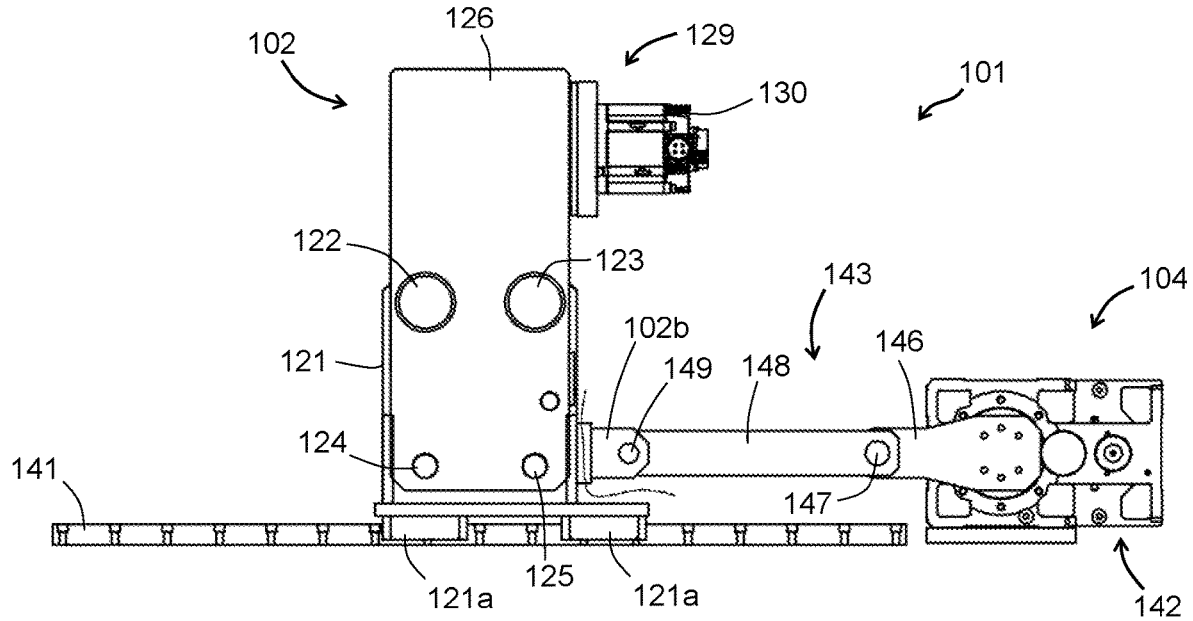
FIG. 14B is a front view of the molding apparatus 101 of FIG. 13.

As shown in FIGS. 13, 14A and 14B, the mold clamping device 102 comprises a movable base 121, four tie bars (tie bars 122 to 125), a first to third platens 126 to 128, and a clamping drive unit 129.

As shown in FIGS. 14A and 14B, guide blocks 121a are attached to the lower surface of the movable base 121. The movable base 121 is guided along pair of transfer rails 141 by moving the guide blocks 121a on the transfer rails 141.

As shown in FIGS. 14A and 14B, the tie bars 122 to 125 are inserted through the movable base 121 in a rectangular arrangement and so as to be orthogonal to the transfer rails 141, and are supported horizontally. One end sides (left end sides in FIG. 14A) of the tie bars 122 to 125 are fixed to the first platen 126, and the other end sides (right end sides in FIG. 14A) of the tie bars 122 to 125 are fixed to the third platen 128. As a result, the first platen 126 and the third platen 128 move in conjunction with each other. Further, the second platen 127 is arranged between the first and third platens 126 and 128, and upper two tie bars 122 and 123 of the four tie bars 122 to 125 are inserted into the second platen 127. The second platen 127 slides along the tie bars 122 and 123.

As shown in FIGS. 13 and 14A, the first platen 126 holds the split die 108A and the second platen 127 holds the split die 108B. Therefore, in the present embodiment, the first and second platens 126 and 127 constitute a pair of platens that hold the die.

Figure 15A:
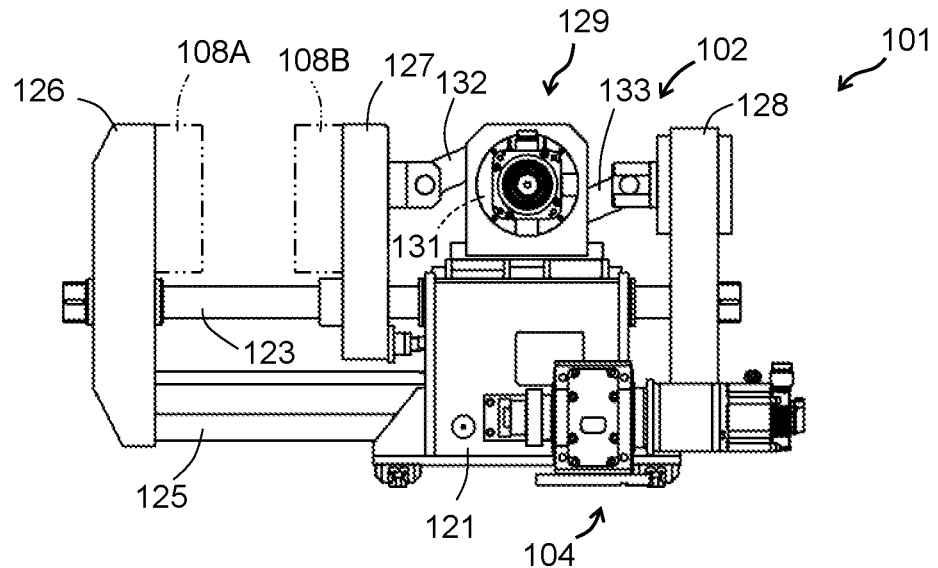
FIG. 15A is an explanatory views showing the operation of a mold clamping device 102 of the molding apparatus 101 of FIG. 13.
Figure 15B:
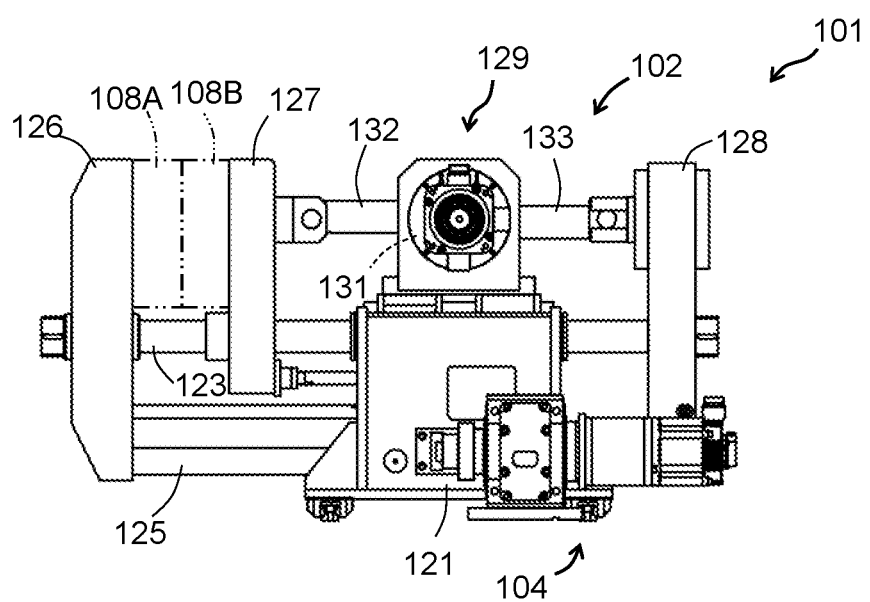
FIG. 15B is an explanatory view showing the operation of a mold clamping device 102 of the molding apparatus 101 of FIG. 13.

The clamping drive unit 129 is used to move the first and second platens 126 and 127 closer to or separated from each other (see FIGS. 15A and 15B). As shown in FIG. 14A, the clamping drive unit 129 comprises a clamping servomotor 130, a disk 131, and a pair of link arms 132 and 133.

The clamping servomotor 130 is fixed to the upper part of the movable base 121 and rotates the disk 131 so that the angle can be controlled. One ends of the link arms 132 and 133 are fixed to the two opposing positions of the disk 131, respectively. The other end of the link arm 132 is pivotally fixed to the bracket 127b of the second platen 127, and the other end of the link arm 133 is pivotally fixed to the bracket 128b of the third platen 128.

Hereinafter, the operation of the mold clamping device 102 comprising the above configuration will be briefly described with reference to FIGS. 15A and 15B. From the state of FIG. 15A, when the clamping servomotor 130 (see FIG. 13) is driven to rotate the disk 131 counterclockwise, the link arm 132 presses the second platen 127 in the direction (left direction in the drawing) toward the clamping reference plane S (center position when the die is clamped, see FIG. 14A). Here, the clamping reference plane S is set directly below the head 107h of the extruder 107, as shown in FIG. 14A. At the same time, the link arm 133 presses the third platen 128 in the opposite direction. Since the third platen 128 is connected to the first platen 126 via the tie bars 122 to 125, the first platen 126 is pulled in the direction toward the clamping reference surface S (to the right in the figure) in conjunction with the movement of the third platen 128. As a result, the first platen 126 and the second platen 127 move so as to move closer to the clamping reference plane S, respectively.

Therefore, by driving the mold clamping device 102 with the parison extruded from the extruder 107 (see FIG. 14A), the split die 108A held on the first platen 126 and the split die 108B held on the second platen 127 can be clamped as shown in FIG. 15B. Then, by blowing air into the parison in this state, a molded body that conforms the shape of the cavity carved on the inner surface of the die can be obtained.

On the other hand, when the clamping servomotor 130 (see FIG. 13) is rotated clockwise from the state of FIG. 15A, the first and second platens 126 and 127 move separated from each other, and the die can be opened.

Transfer Means 104

The transfer means 104 comprises the transfer rails 141 described above, a rotary drive means 142, and the link mechanism 143. The transfer means 104 is used for attaching/detaching the split dies 108A and 108B of the mold clamping device 102 and for maintaining them, and for continuous operation of the molding apparatus 101 described later. Two transfer rails 141 are provided along the transfer direction of the mold clamping device 102, and in the present embodiment, they extend in a direction perpendicular to the mold clamping direction of the mold clamping device 102.

The rotary drive means 142 comprises a transfer servomotor 144 and a speed reducer 145. The rotary drive means 142 is fixed to the installation location (floor surface or the like) of the molding apparatus 101, and by transmitting the rotation of the transfer servomotor 144 to the link mechanism 143 via the speed reducer 145, the link mechanism 143 and the mold clamping device 102 is driven. The speed reducer 145 is used to obtain torque to transfers a heavy mold clamping device 102.

The link mechanism 143 comprises a first arm 146, a first rotating shaft 147, a second arm 148, and a second rotating shaft 149. The base end side of the first arm 146 is connected to an output shaft of the rotary drive means 142 (reducer 145). The tip end side of the first arm 146 is rotatably connected to the base end side of the second arm 148 via the first rotating shaft 147. The tip end side of the second arm 148 is rotatably connected to the bracket 102b attached to the mold clamping device 102 via the second rotating shaft 149. Further, the output shaft of the rotary drive means 142, the first rotating shaft 147, and the second rotating shaft 149 are arranged in parallel, and thus the first and second arms 146 and 148 move within substantially the same plane.

Hereinafter, the operation of the transfer means 104 having the above configuration will be described with reference to FIGS. 16A, 16B and FIGS. 17A to 17C.

Figure 17A:
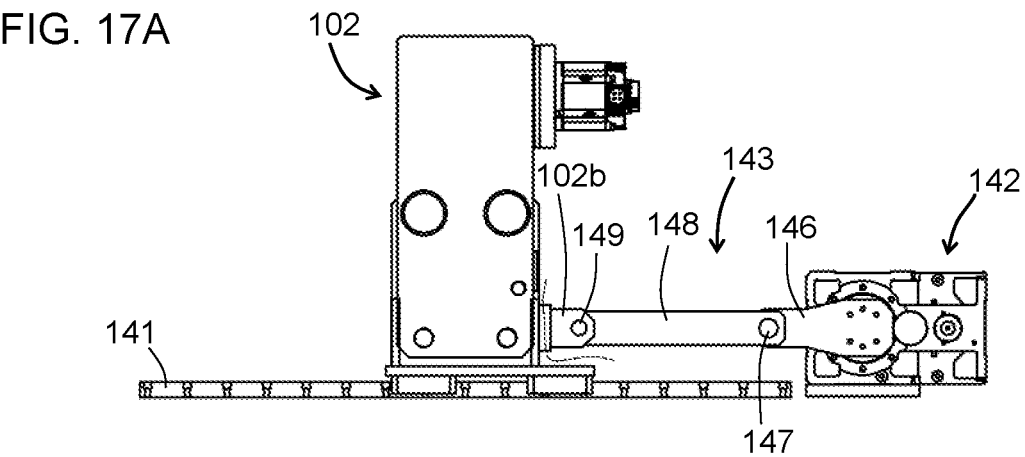
FIG. 17A is an explanatory views showing the operation of the transfer means 104 of FIGS. 16A and 16B from another angle.

FIGS. 16A and 17A show the state of the transfer means 104 when the mold clamping device 102 of the present embodiment performs mold clamping. Point P in FIG. 16A is the drop point of the parison dropping from the head 107h of the extruder 107 in FIG. 14A. In this state, the mold clamping device 102 clamps the parison. When the mold clamping device 102 is in the position of clamping, the link mechanism 143 of the transfer means 104 is set to a state in which the first and second arms 146 and 148 extend in a straight line and parallel to the transfer rails 141, as shown in FIG. 17A.

Figure 17B:
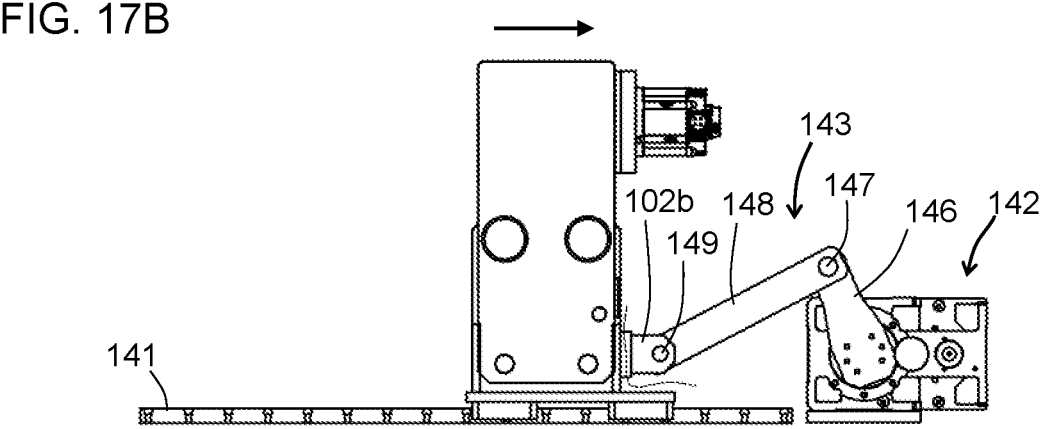
FIG. 17B is an explanatory view showing the operation of the transfer means 104 of FIGS. 16A and 16B from another angle.

When the transfer servomotor 144 of the transfer means 104 is driven from the state of FIGS. 16A and 17A, the first arm 146 rotates about the base end side thereof via the speed reducer 145. Then, the second arm 148 moves in conjunction with the first arm 146. At this time, the tip end side of the second arm 148 is pivotally fixed to the bracket 102b of the mold clamping device 102 via the second rotating shaft 149, and the movement of the mold clamping device 102 is substantially restricted only in the direction along the transfer rails 141 due to its weight. Therefore, as the first arm 146 rotates, the second arm 148 acts to pull the bracket 102b in the direction along the transfer rails 141. As a result, as shown in FIG. 17B, the mold clamping device 102 moves on the transfer rails 141 in the direction approaching the rotary drive means 142.

Figure 17C:
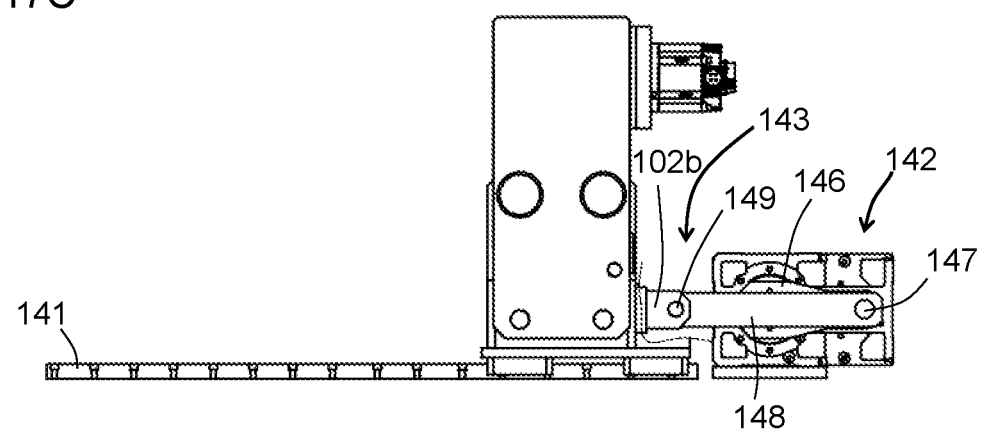
FIG. 17C is an explanatory view showing the operation of the transfer means 104 of FIGS. 16A and 16B from another angle.

Then, when the first arm 146 is rotated 180 degrees from the state of FIGS. 16A and 17A by driving the transfer servomotor 144, the first and second arms 146 and 148 completely overlap each other as shown in FIGS. 16B and 17C, and the transfer operation is completed. By driving the transfer servomotor 144 in the opposite direction from the states shown in FIGS. 16B and 17C, it is possible to return to the states shown in FIGS. 16A and 17A.

Effect

As described above, the molding apparatus 101 of the present embodiment comprises the transfer means 104 for transferring the mold clamping device 102 along the transfer rails 141, and the transfer means 104 comprises the rotary drive means 142 and the link mechanism 143 having the first and second arms 146 and 148. With such a configuration, it is possible to transfer the mold clamping device 102 at a higher speed than a method using a ball screw as a means for transferring the mold clamping device.

Further, the link mechanism 143 of the present embodiment sets the position when the two arms 146 and 148 are in a straight line (see FIGS. 16A and 17A) to the position where the mold clamping device 102 performs mold clamping. As a result, the ratio of the error in the position of the mold clamping device 102 in the transfer direction to the error in the angle of the transfer servomotor 144 becomes small, and the transfer error can be suppressed in the position of mold clamping where transfer accuracy is required.

In addition, in the case of the method using a ball screw, it is necessary to control the acceleration/deceleration of the servomotor and to provide a separate brake in order to avoid the impact load. In this respect, according to the method of the present invention, the method of the present invention does not require any special control because the transfer is automatically stopped when the two arms of the link mechanism 143 are fully extended. Further, in the method of the present invention, the transfer speed changes with time as represented by the sine curve and becomes 0 when the arm is fully extended/contracted. Therefore, the mold clamping device 102 can be automatically accelerate of decelerate without any special control.

Figure 18:
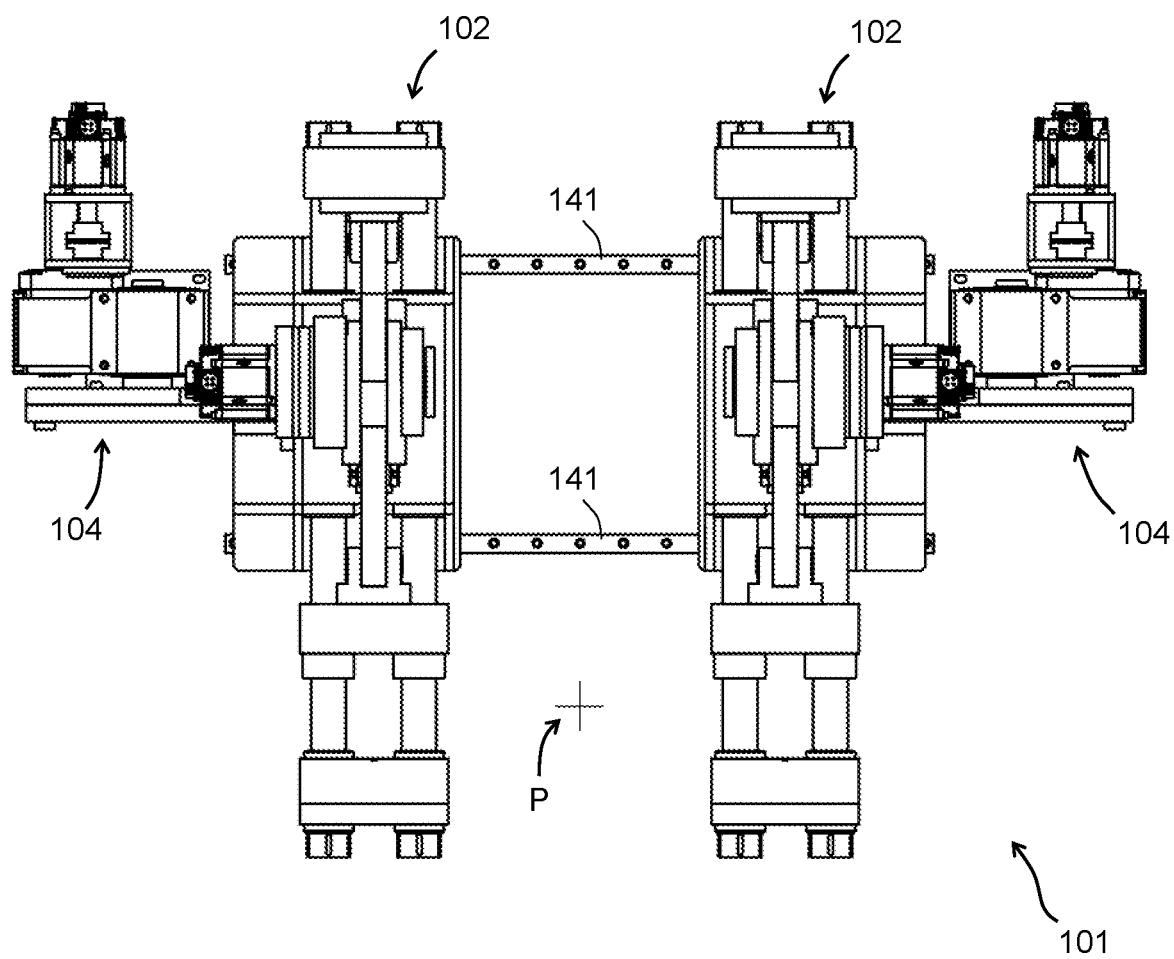
FIG. 18 is a plan view showing a state in which a plurality of molding apparatuses 101 according to the first embodiment of the second viewpoint of the present invention are arranged.

As a usage pattern of the molding apparatus 101, it is assumed that the parison is continuously supplied from one extruder 107, and a plurality of mold clamping devices 102 are transferred and used alternately to continuously perform mold clamping. For example, FIG. 18 shows an example in which two mold clamping devices 102 and two transfer means 104 corresponding thereto are arranged line-symmetrically, and two mold clamping devices 102 are arranged on a pair of transfer rails 141. In this case, the mold clamping can be continuously performed by alternately moving the centers of the molds attached to the two mold clamping devices 102 to the drop point P of the parison by each transfer means 104. Even when the molding apparatus 101 has such a configuration, since the link mechanism 143 is used as the transfer means 104 in the molding apparatus 101 of the present invention, the mold clamping device 102 is transferred at high speed and the mold clamping device 102 can perform mold clamping continuously.

2. Second Embodiment of the Second Viewpoint

Next, the molding apparatus 101 according to the second embodiment of the second aspect of the present invention will be described with reference to FIGS. 19A to 19C. The molding apparatus 101 of the present embodiment differs from that of the first embodiment of the second aspect only in the configuration of the transfer means 104. Therefore, in the following, the description of the configuration common to the first embodiment of the second viewpoint will be omitted, and only the differences will be described.

The transfer means 104 of the present embodiment comprises a pair of transfer rails 141*a* and 141*b*, a rail 141*c* for the rotary drive means, a rotary drive means 142, a link mechanism 143, and a fixing member 150 fixed to an installation location. The rail 141*c* for the rotary drive means is a rail arranged in parallel with the transfer rails 141*a* and 141*b* at positions between them. The rail 141*c* for the rotary drive means together with the transfer rail 141*a*, slidably supports the rotary drive means 142.

Figure 19A:
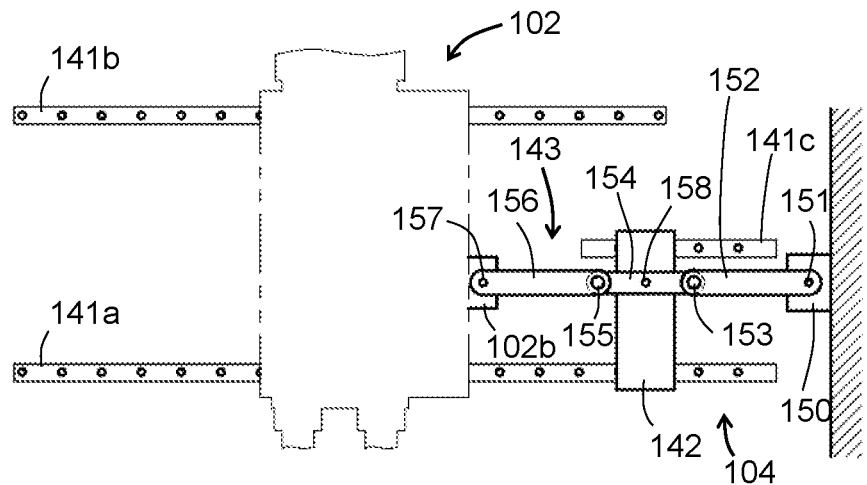
FIG. 19A is an explanatory views showing the operation of the transfer means 104 of the molding apparatus 101 according to the second embodiment of the second viewpoint of the present invention.
Figure 19B:
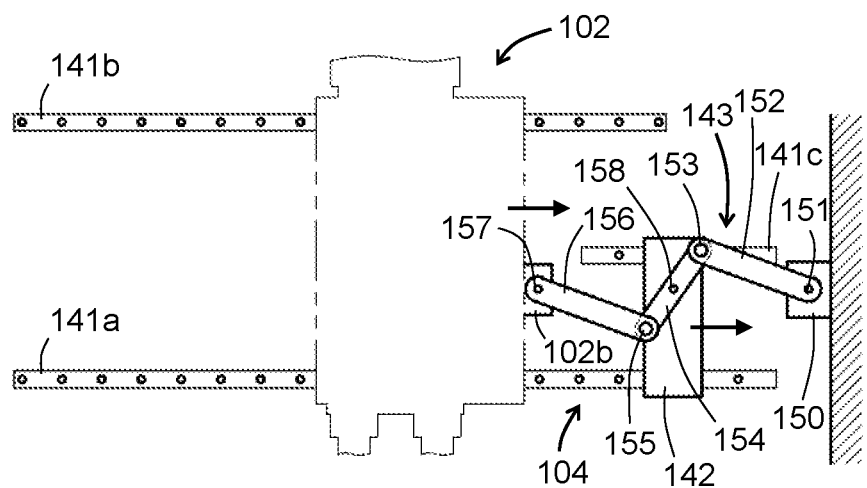
FIG. 19B is an explanatory view showing the operation of the transfer means 104 of the molding apparatus 101 according to the second embodiment of the second viewpoint of the present invention.
Figure 19C:
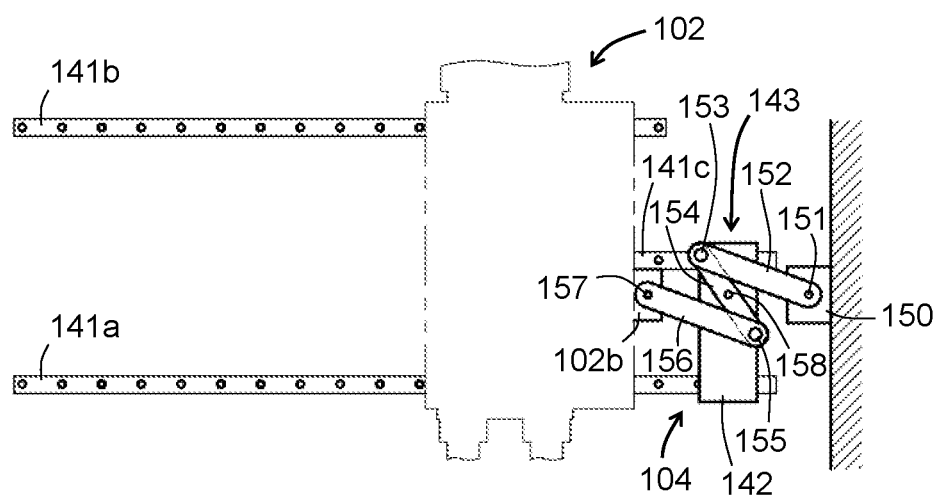
FIG. 19C is an explanatory view showing the operation of the transfer means 104 of the molding apparatus 101 according to the second embodiment of the second viewpoint of the present invention.

The rotary drive means 142 is composed of a transfer servomotor and a speed reducer as in the first embodiment of the second aspect (the illustration of these configurations is omitted in FIGS. 19A to 19C). On the other hand, the rotary drive means 142 of the present embodiment is not fixed at the installation location of the molding apparatus 101, but is supported by the transfer rails 141*a* and the rail 141*c* for the rotary drive means and movable on these rails.

The link mechanism 143 comprises a first rotating shaft 151, a first arm 152, a second rotating shaft 153, a second arm 154, a third rotating shaft 155, a third arm 156, and a fourth rotating shaft 157. The base end side of the first arm 152 is rotatably connected to the fixing member 150 fixed to the wall surface or the like of the installation location via the first rotating shaft 151. In the description of the link mechanism 143 here, the fixing member 150 side (the right side in FIGS. 19A to 19C) is referred to as a base end side. The tip end side of the first arm 152 is rotatably connected to the base end side of the second arm 154 via the second rotating shaft 153. The tip end side of the second arm 154 is connected to the third arm 156 via the third rotating shaft 155. The tip end side of the third arm 156 is rotatably connected to the bracket 102*b* attached to the mold clamping device 102 via the fourth rotating shaft 157.

Further, the output shaft 158 of the rotary drive means 142 is attached to the center position of the second arm 154. That is, in the present embodiment, the rotary drive means 142 is configured to rotate the second arm 154 with the center of the second arm 154 as the center of rotation.

Next, the operation of the transfer means 104 having the above configuration will be described.

FIG. 19A shows the state of the transfer means 104 when the mold clamping device 102 of the present embodiment performs mold clamping. In this state, the mold clamping device 102 clamps the parison. When the mold clamping device 102 is in the position of clamping, the link mechanism 143 of the transfer means 104 is in a state in which the first to third arms 152, 154, 156 extend in a straight line parallel to the transfer rails 141*a* and 141*b*.

When the transfer servomotor (not shown) of the rotary drive means 142 is driven from the state of FIG. 19A, the second arm 154 rotates about the output shaft 158 of the rotary drive means 142. Here, the link mechanism 143 of the present embodiment can be considered as two link mechanisms with the output shaft 158 (the power source) as a boundary, one on the first arm 152 side and the other on the third arm 156 side. Therefore, in the following, the operation of the transfer means 104 by the link mechanism 143 will be described separately as the operation on the first arm 152 side and the operation on the third arm 156 side.

On the first arm 152 side, when the second arm 154 tries to rotate about the output shaft 158, the first and second arms 152 and 154, which are in a straight line, try to bend at the second rotating shaft 153. Then, the first rotating shaft 151 (or the fixing member 150) and the output shaft 158 (or the rotating driving means 142) receive a force in a direction of approaching each other. By the way, at this time, the fixing member 150 is fixed to the wall surface or the like and cannot move, while the rotary drive means 142 can move on the transfer rail 141*a* and the rail 141*c* for the rotary drive means. Therefore, when the second arm 154 rotates about the output shaft 158, as shown in FIG. 19B, the rotary drive means 142 moves in the direction approaching the fixing member 150 along the transfer rail 141*a* and the rail 141*c* for the rotary drive means.

On the other hand, on the third arm 156 side, when the second arm 154 tries to rotate about the output shaft 158, the second and third arms 154 and 156, which are in a straight line, try to bend at the third rotating shaft 155. Then, the output shaft 158 (or the rotary drive means 142) and the fourth rotating shaft 157 (or the mold clamping device 102) receive a force in a direction of approaching each other. Here, the rotary drive means 142 can move on the transfer rail 141*a* and the rail 141*c* for the rotary drive means along these rails, and the mold clamping device 102 can also move on the transfer rails 141*a* and 141*b* along these rails. Therefore, when the second arm 154 rotates about the output shaft 158, as shown in FIG. 19B, the rotary drive means 142 and the mold clamping device 102 move in the direction of approaching each other along the transfer rails 141*a*, 141*b* and the rail 141*c* for the rotary driving means.

Combining the above operation on the first arm 152 side and the operation on the third arm 156 side result in the mold clamping device 102 moving toward the fixing member 150 side. The moving distance is the sum of the distance by which the rotary drive means 142 moves toward the fixing member 150 due to the operation of the first arm 152 side and the distance by which the mold clamping device 102 approaches the rotary drive means 142 due to the operation of the third arm 156 side.

Then, by further driving the transfer servomotor 144, it is possible to transfer to the state shown in FIG. 19C. And, by driving the transfer servomotor 144 in the opposite direction from the state shown in FIG. 19C, it is possible to return to the state shown in FIG. 19A.

Effect

In the transfer means 104 of the present embodiment, the link mechanism 143 comprises three arms of the first to third arms 152, 154, and 156, the rotary drive means 142 drives the second arm 154 in the middle, and the rotary drive means 142 itself can move along the rail. With such a configuration, the length of each arm can be shortened, and the link mechanism can be configured in a small space. Further, even in the configuration of the second embodiment, the mold clamping device 102 can be transferred at a higher speed as compared with the method using a ball screw.

3. Variation

The present invention can also be implemented in the following embodiments:

In the above embodiments, the clamping drive unit 129 of the mold clamping device 102 is configured to perform the mold clamping operation by the link mechanism. However, as the drive unit, a hydraulic type or a rack and pinion type can be used. Further, the mold clamping device 102 is not limited to the above configuration, and any configuration can be used.

In the above embodiments, a two-arm type configuration and a three-arm type configuration are mentioned as the link mechanism 143 of the transfer means 104. However, the configuration is not limited to such configurations. That is, any configuration can be used as long as the mold clamping device 102, which is to be transferred, can be transferred along the transfer rails.

In the second embodiment of the second aspect, the output shaft 158 is attached to the center of the second arm 154. However, the position where the output shaft 158 is attached may be anywhere as long as it is between the position connected to the first arm 152 (the second rotating shaft 153) and the position connected to the third arm 156 (third rotating shaft 155).

Embodiment of Third Viewpoint

1. Configuration of the Molded Product Manufacturing System 201

Figure 20:
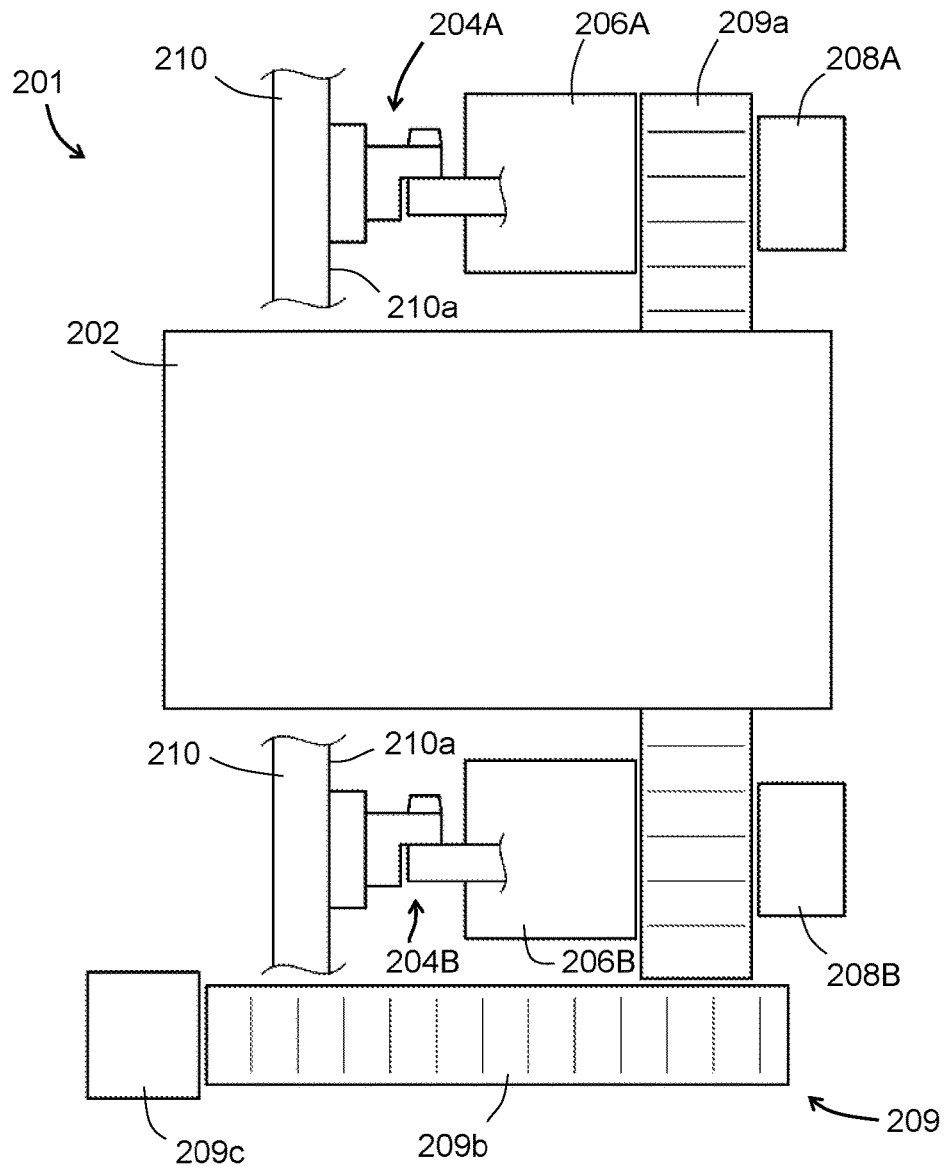
FIG. 20 is a plan view schematically showing the arrangement of a blow molding machine 202, multi-axis robots 204A and 204B, deburring devices 206A and 206B, and cutting devices 208A and 208B of a molded product manufacturing system 201 according to an embodiment of the third viewpoint of the present invention.

As shown in FIG. 20, the molded product manufacturing system 201 according to the third aspect of the present invention comprises a blow molding machine 202, multi-axis robots 204A and 204B, deburring devices 206A and 206B, cutting devices 208A and 208B, and a burr reusing means 209. The molded product manufacturing system 201 of the present embodiment comprises a blow molding step S1 for molding the molded body X1 by the blow molding machine 202, a deburring step S2 for separating the molded body X1 into a molded main body X2 and a burr Br by the deburring devices 206A and 206B, and a cutting step S3 for cutting the molded main body X2 with the cutting devices 208A and 208B to complete the molded product (not shown), and the entire process is fully automated. In each of the steps S1 to S3, the molded body X1, the molded main body X2, or the molded product is conveyed by the multi-axis robots 204A and 204B. Further, the burr Br generated in the deburring step S2 is reused by the burr reusing means 209. Hereinafter, the configuration of each element of the molded product manufacturing system 201 of the present embodiment will be specifically described.

1.1 The Blow Molding Machine 202

First, the configuration of the blow molding machine 202 will be described with reference to FIGS. 21 to 25. The blow molding machine 202 of the present embodiment comprises a resin supply device 220, a first and second mold clamping devices 230A and 230B as transfer devices, and a mold clamping device transfer means 270. The first mold clamping device 230A comprises a pair of dies 231A and 232A, and the second mold clamping device 230B comprises a pair of dies 231B and 232B. Further, the mold clamping device transfer means 270 comprises a first electric cylinder 271A for transferring the first mold clamping device 230A, a second electric cylinder 271B for transferring the second mold clamping device 230B, and transfer rails 272. The blow molding machine 202 of the present embodiment is a two-station system comprising two mold clamping devices. That is, in the blow molding machine 202, two mold clamping devices 230A and 230B and two electric cylinders 271A and 271B corresponding thereto are arranged line-symmetrically with respect to one resin supply device 220, and two mold clamping devices 230A and 230B are configured to be movable on a pair of transfer rails 272. The first and second mold clamping devices 230A and 230B, the first and second electric cylinders 271A and 271B have the same configuration, respectively. Hereinafter, only the configurations of the first mold clamping device 230A and the first electric cylinder 271A will be described.

Figure 22:
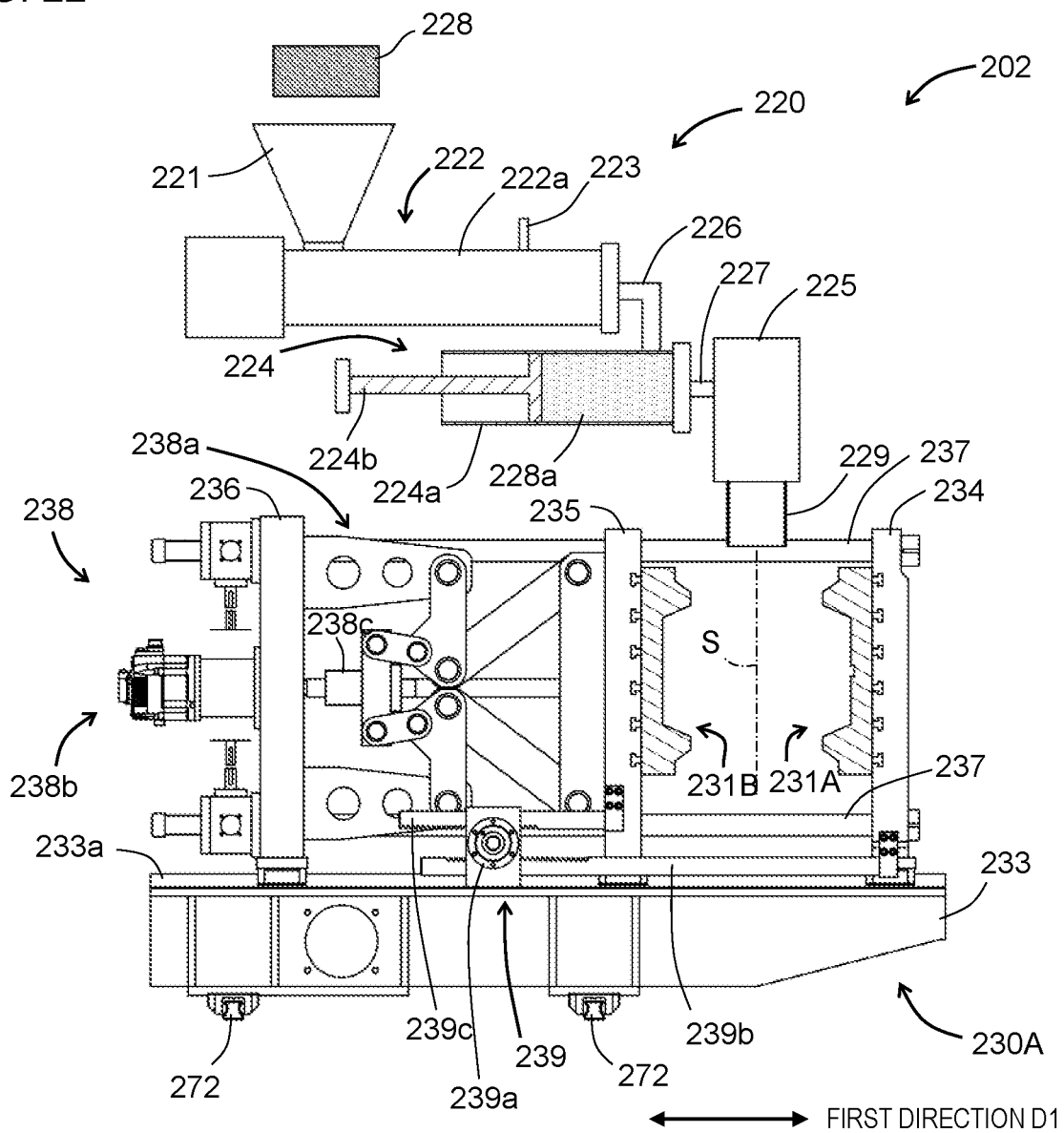
FIG. 22 is a schematic view of the blow molding machine 202 of FIG. 21 when viewed from the side.

As shown in FIG. 22, the resin supply device 220 comprises a hopper 221, an extruder 222, an injector 223, an accumulator 224, and a head 225. The extruder 222 and the accumulator 224 are connected via a connecting pipe 226. The accumulator 224 and the head 225 are connected via a connecting pipe 227.

The hopper 221 is used to put the raw resin 228 into a cylinder 222a of the extruder 222. The form of the raw resin 228 is not particularly limited, but is usually in the form of pellets. The raw resin 228 is a thermoplastic resin such as polyolefin. Further, as the raw resin 228, a burr Br or the like recovered and crushed by the burr reusing means 209 described later can also be used. The raw resin 228 is put into the cylinder 222a from the hopper 221 and then heated in the cylinder 222a to be melted into a molten resin. Further, it is conveyed toward the tip of the cylinder 222a by the rotation of the screw arranged in the cylinder 222a.

The cylinder 222a comprises an injector 223 for injecting a foaming agent into the cylinder 222a. Examples of the foaming agent injected from the injector 223 include a physical foaming agent, a chemical foaming agent, and a mixture thereof, and a physical foaming agent is preferable. If a chemical foaming agent is used, it may be injected from the hopper 221 instead of being injected from the injector 223.

The molten resin 228a, which is obtained by melt-kneading the raw resin 228 and the foaming agent, is extruded from the resin extrusion port of the cylinder 222a and injected into the accumulator 224 through the connecting pipe 226. The accumulator 224 comprises a cylinder 224a and a piston 224b slidable inside the cylinder 224a, and the molten resin 228a can be stored in the cylinder 224a. Then, by moving the piston 224b after a predetermined amount of the molten resin 228a is stored in the cylinder 224a, the molten resin 228a is pushed out from the die slit provided in the head 225 through the connecting pipe 227 and dropping to form a foamed parison 229. The shape of the parison 229 is not particularly limited, and may be tubular or sheet-shaped. The addition of a foaming agent is not essential.

Figure 21:
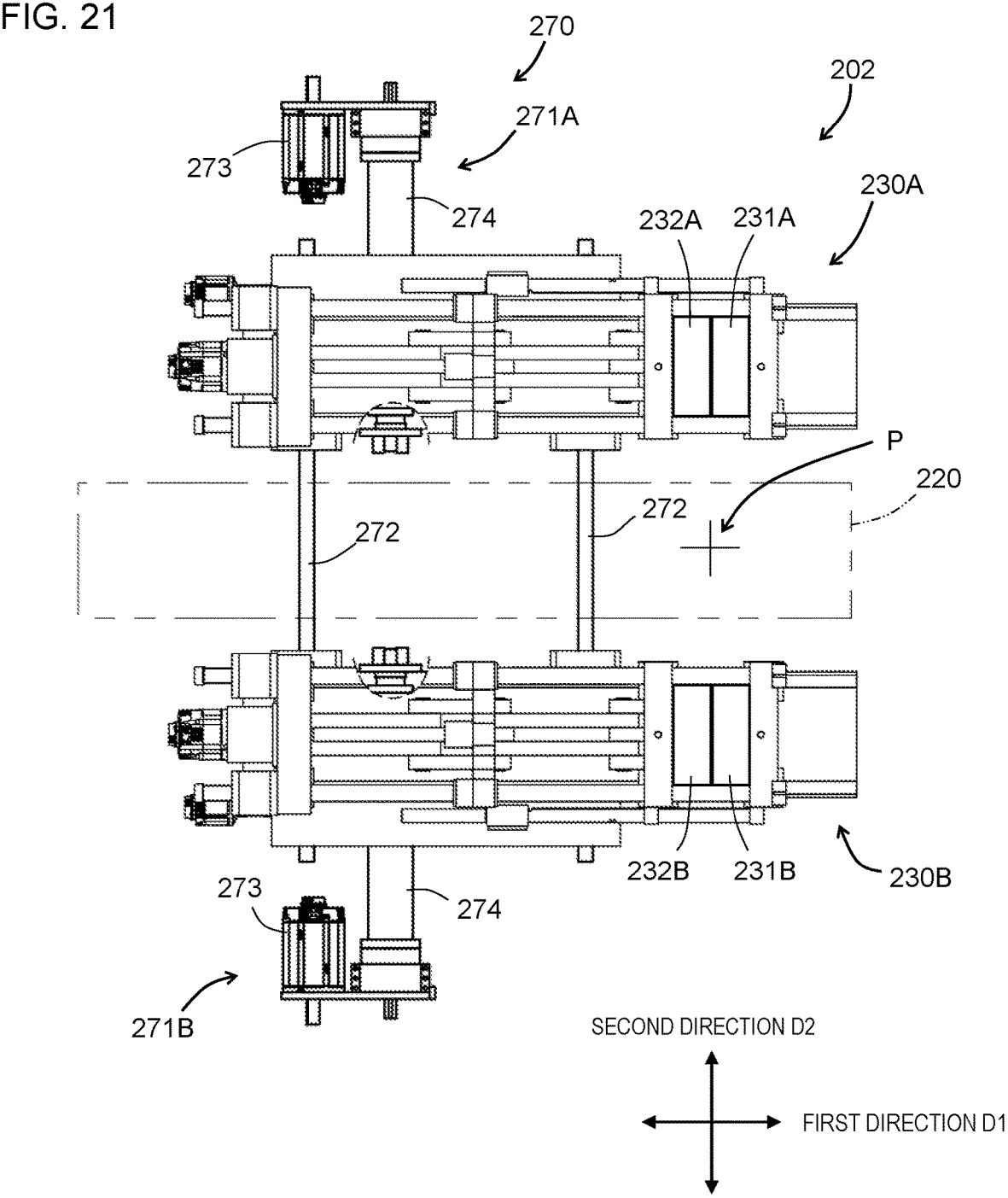
FIG. 21 is a plan view showing the blow molding machine 202 of the molded product manufacturing system 201 of FIG. 20.

As shown in FIGS. 21 and 22, the first mold clamping device 230A comprises a pair of dies 231A and 232A, a movable base 233, a first to third platens 234 to 236, tie bars 237, a clamping drive unit 238, and a clamping reference plane holding unit 239.

Figure 23A:
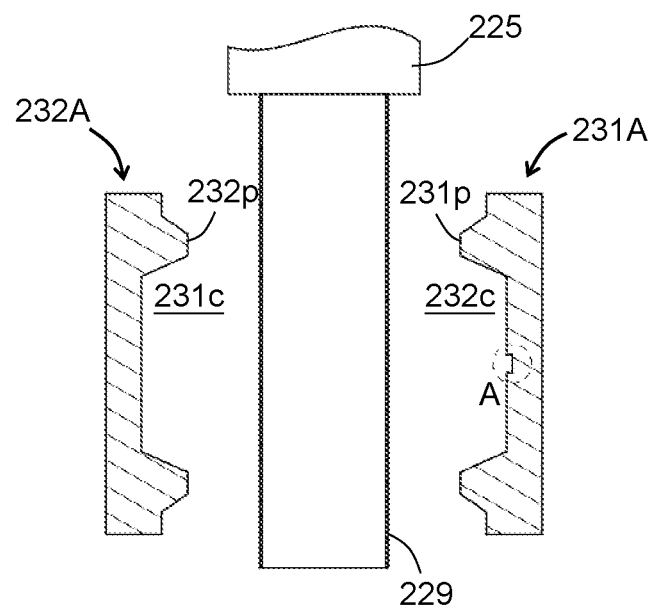
FIG. 23A is an explanatory views showing the operation of dies 231A and 232A of the blow molding machine 202 of FIG. 21.
Figure 24A:
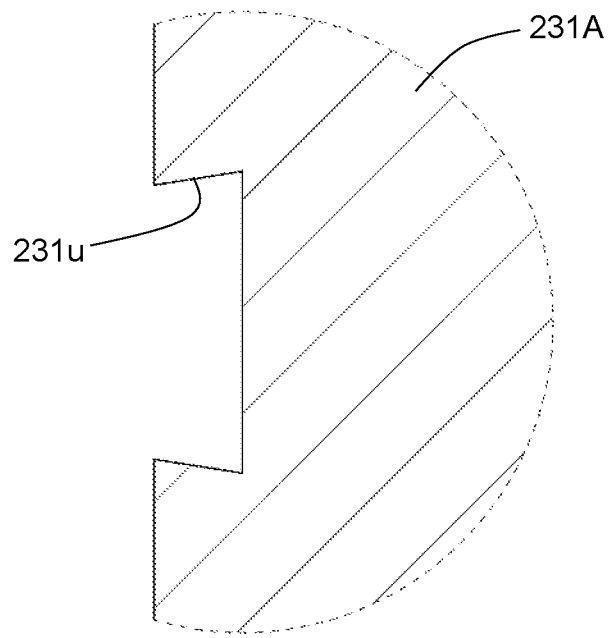
FIG. 24A is an enlarged view of the region A in FIG. 23A.
Figure 24B:
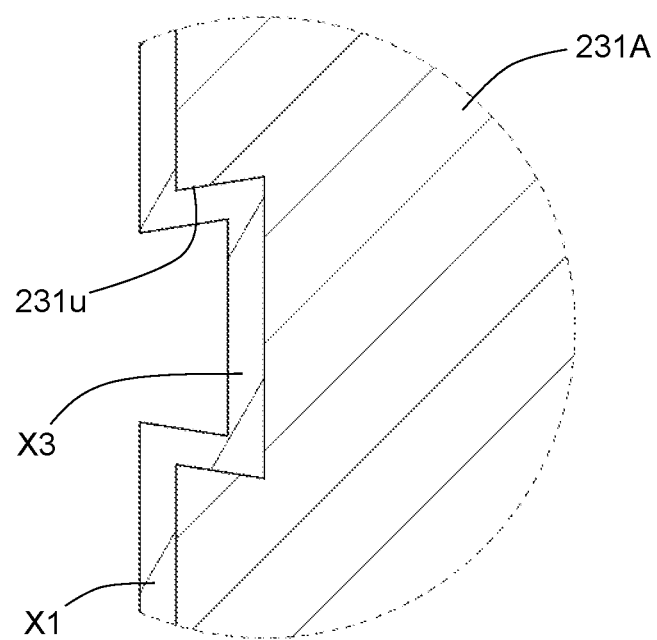
FIG. 24B is an enlarged view of the region A in FIG. 23B.

As shown in FIG. 23A, the dies 231A and 232A comprise cavities 231c and 232c, respectively, and pinch-off portions 231p and 232p provided along the periphery thereof. As shown in FIG. 24A, the die 231A is provided with an undercut structure 231u. The undercut structure is a structure in which an engaging structure is formed between the molded body X1 and the die 231A, and is, for example, a reverse taper shape. The undercut structure 231u may be provided inside the cavity 231c or may be provided outside the pinch-off portion 231p.

As shown in FIGS. 21 and 22, the movable base 233 is arranged on the transfer rails 272, and can be moved along the transfer rails 272 by driving the first electric cylinder 271A described later. A pair of mold clamping rails 233a are arranged on the upper surface of the movable base 233. The first platen 234 holds the die 231A and the second platen 235 holds the die 232A. Four tie bars 237 are inserted in the corners of the first to third platens 234 to 236 in parallel with the mold clamping rails 233a. The first to third platens 234 to 236 are movable along the mold clamping rails 233a arranged on the upper surface of the movable base 233. One end sides (right end sides in FIG. 22) of the four tie bars 237 are fixed to the first platen 234, and the other end sides (left end sides in FIG. 22) of the tie bars 237 are fixed to the third platen 236. As a result, the first to third platens 234 to 236 move in conjunction with each other. Further, the second platen 235 is arranged between the first and third platens 234 to 236, and slides along the tie bars 237.

The clamping drive units 238 is used to move the first and second platens 234 and 235 closer to or separated from each other. As shown in FIG. 22, the lamping drive unit 238 comprises a toggle mechanism 238a, a servomotor 238b, and a ball screw 238c. The toggle mechanism 238a is configured such that the second and third platens 235 and 236 are connected by links, and the second and third platens 235 and 236 drive closer to or separated from each other by driving the servomotor 238b and the ball screw 238c. The specific configuration of the toggle mechanism 238a will be omitted. By moving the second and third platens 235 and 236 closer to or separated from each other, the distance between the first and second platens 234 and 235 become closer to or separated from each other. When the first and second platens 234 and 235 approach each other, the die 231A held by the first platen 234 and the die 232A held by the second platen 235 are clamped. When they separate, the die 231A and the die 232A are opened.

In the following description, the direction in which the first to third platens 234 to 236 move along the mold clamping rails 233a, that is, the direction in which the pair of dies 231A and 232A clamp and open the die, will be referred to as the first direction D1. In FIGS. 20 to 32, the left-right direction of the paper surface is the first direction D1.

The clamping reference plane holding unit 239 is configured by a rack and pinion mechanism. As shown in FIG. 22, the pinion 239a is fixed to the movable base 233, and the racks 239b and 239c are fixed to the first and second platens 234 and 235, respectively. The clamping reference plane holding unit 239 functions to symmetrically move the first and second platens 234 and 235 with respect to the clamping reference plane S (center position when the die is clamped). Therefore, the dies 231A and 232A also move symmetrically with respect to the clamping reference plane S (center position when the dies are clamped). As a result, by aligning the position directly below the head 225 of the resin supply device 220 and the clamping reference plane S, the parison dropping from the resin supply device 220 can be clamped without misalignment.

As shown in FIG. 21, the first electric cylinder 271A of the mold clamping device transfer means 270 comprises a brake motor 273 and a ball screw mechanism 274. The first electric cylinder 271A of the present embodiment converts a rotary motion of the brake motor 273 into a linear motion by the ball screw mechanism 274 via the speed reducer, and moves the first mold clamping device 230A along the transfer rails 272. Here, the transfer rails 272 is arranged to extend in a direction perpendicular to the first direction in which the pair of dies 231A and 232A are clamped and opened and to the vertical axis. In the following description, the direction perpendicular to the first direction D1 and the vertical axis are referred to as the second direction D2. In FIGS. 20 and 21, the vertical direction of the paper surface is the second direction D2. In FIG. 20, the description of the first and second electric cylinders 271A and 271B are omitted, and they are actually installed below the deburring devices 206A and 206B.

1.2 Multi-Axis Robot 204A

Next, the configuration of the multi-axis robot 204A will be described with reference to FIGS. 27 to 29. The multi-axis robot 204A is arranged on one side of the second direction D2 (upper side of FIG. 20) of the blow molding machine 202 so as to correspond to the first mold clamping device 230A. The multi-axis robot 204B is arranged on the other side of the second direction D2 (lower side of FIG. 20) of the blow molding machine 202 so as to correspond to the second mold clamping device 230B. Since the configurations of the two multi-axis robots 204A and 204B are the same, only the configuration of the multi-axis robot 204A will be described below.

Figure 27:
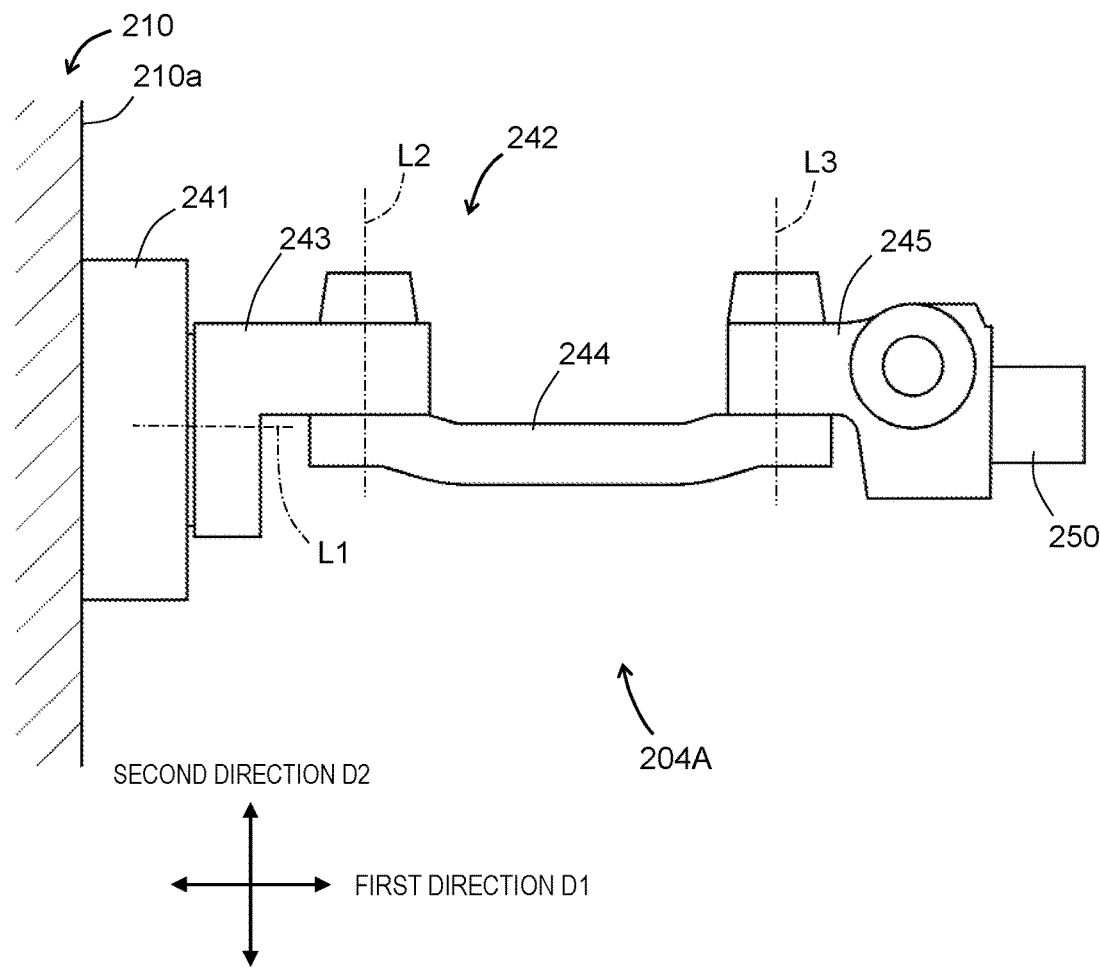
FIG. 27 is a plan view schematically showing the multi-axis robot 204A (204B) of the molded product manufacturing system 201 of FIG. 20.
Figure 28:
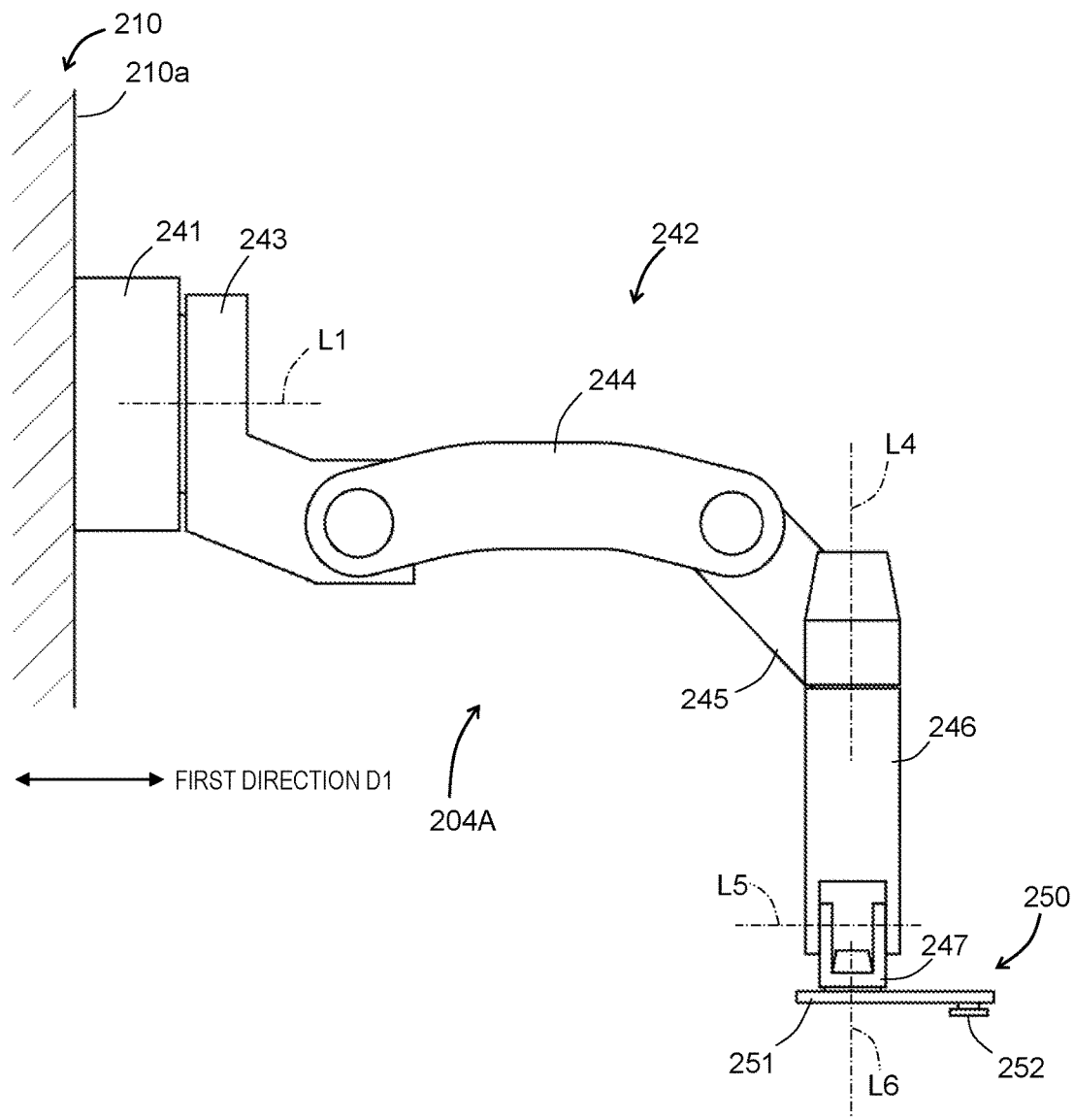
FIG. 28 is a side view schematically showing the multi-axis robot 204A (204B) of FIG. 27.
Figure 29:
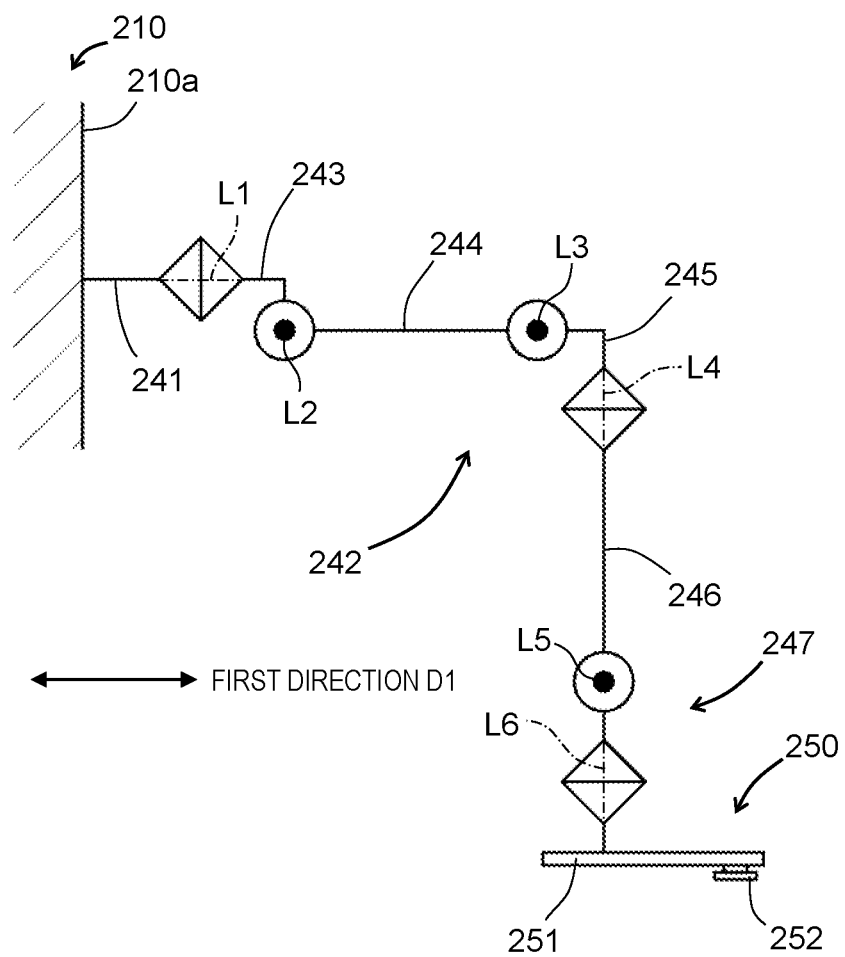
FIG. 29 is an explanatory view showing an axis configuration of the multi-axis robot 204A (204B) of FIG. 27.

As shown in FIGS. 27 and 28, the multi-axis robot 204A of the present embodiment comprises a base portion 241, a 6-axis arm portion 242 connected to the base portion 241, and a hand portion 250 attached to the tip end of the arm portion 242. In the present embodiment, as shown in FIG. 20, the base portion 241 is fixed to a support surface 210a of a support frame 210 instead of the floor surface. Here, the support frame 210 is a part of a frame that supports the resin supply device 220 (see FIG. 22) arranged above the first mold clamping device 230A, and is located above the deburring device 206A and a cutting device 208A described later. Further, in the present embodiment, the support surface 210a is a surface of the support frame 210 perpendicular to the floor surface. Therefore, the normal of the support surface 210a and the above-mentioned first direction D1 are in the same direction, and the angle formed by them is 0°. The wall surface of the building may be used as the support frame 210 as long as it has the support strength to support the multi-axis robot 204A.

The arm portion 242 comprises a rotation base portion 243, a first arm 244, a second arm 245, a third arm 246, and a wrist portion 247. As shown in FIG. 28 and the explanatory view showing the axis configuration in FIG. 29, the rotation base portion 243 is rotatably supported by the base portion 241 with the first axis L1 as the central axis parallel to the first direction DE The first arm 244 is rotatably supported by the rotation base portion 243 about the second axis L2, which is in a twisted position with respect to the first axis L1 and is orthogonal to it.

The second arm 245 is rotatably supported by the first arm 244 about the third axis L3 as a central axis parallel to the second axis L2. The third arm 246 is rotatably supported by the second arm 245 about the fourth axis L4 as a central axis, which is in a twisted position with respect to the third axis L3 and is orthogonal to the third axis L3. The wrist portion 247 is composed of a total of two axes, the fifth axis L5 and the sixth axis L6, and its base end is rotatably supported by the tip of the third arm 246. The fifth axis L5 is orthogonal to the fourth axis L4, and the sixth axis L6 is orthogonal to the fifth axis L5. The hand portion 250 is attached to the tip of the wrist portion 247. The position and posture of the hand portion 250 are controlled by a control means (not shown). The configuration of the multi-axis robot 204A having such 6-axis degrees of freedom is not limited to the above, and any known configuration can be used.

The hand portion 250 comprises a main body portion 251 and a holding mechanism 252. The holding mechanism 252 is configured to hold the molded body X1 (see FIGS. 25B and 30). Specifically, the holding mechanism 252 is a suction pad having a function of holding (sucking) the molded main body X2 by a suction force, but may hold the molded main body X2 by another configuration.

1.3 Deburring Device 206A

Next, the configuration of the deburring device 206A will be described with reference to FIG. 30. The deburring device 206A is arranged on the one side of the second direction D2 (upper side of FIG. 20) of the blow molding machine 202 so as to correspond to the first mold clamping device 230A. The deburring device 206B is arranged on the other side of the second direction D2 (lower side of FIG. 20) of the blow molding machine 202 so as to correspond to the second mold clamping device 230B. Since the configurations of the two deburring devices 206A and 206B are the same, only the configuration of the deburring device 206A will be described below.

The deburring device 206A separates the molded body X1 molded by the blow molding machine 202 into the molded main body X2 and the burr Br. The deburring device 206A of the present embodiment comprises a pair of abutting members 260 as a deburring mechanism, an inclined member 261, and protruding mechanisms 262. The pair of abutting members 260 are movable in the first direction D1 (left-right direction in FIG. 30), respectively. An opening (gap) 260a is provided between the pair of abutting members 260, and the size of the opening 260a can be changed by the pair of abutting members 260 moving closer to or separated from each other.

The inclined member 261 has an inclined surface 261a and is arranged below the pair of abutting members 260. The inclined surface 261a is provided with through holes 261b. Further, the protruding mechanisms 262 are arranged below the inclined surface 261a. The protruding mechanisms 262 has a protrusion 262a, and the protrusion 262a can protrude from the inclined surface 261a through the through hole 261b. A plurality of protruding mechanisms 262 are preferably provided, and are arranged at positions separated from each other.

1.4 Cutting Device 208A

Next, as shown in FIG. 20, the cutting device 208A is arranged on the one side of the second direction D2 (upper side of FIG. 20) of the blow molding machine 202 so as to correspond to the first mold clamping device 230A. The cutting device 208B is arranged on the other side of the second direction D2 (lower side of FIG. 20) of the blow molding machine 202 so as to correspond to the second mold clamping device 230B. The configurations of the two cutting devices 208A and 208B are the same.

The cutting device 208A is a device that cuts and removes a part of the molded main body X2 that has been deburred by the deburring device 206A, for example, a bag portion when the molded product is a duct, to obtain a molded product. Since a conventionally known configuration can be used as the cutting device 208A (and the cutting device 208B), detailed description thereof will be omitted. Further, depending on the type of the molded product, it is possible to configure the structure so that the cutting device 208A and the cutting device 208B are not provided.

1.5 Burr Reusing Means 209

The burr reusing means 209 is a mechanism for collecting and reusing the burr Br removed by the deburring device 206A and the bag portion removed by the cutting device (hereinafter referred to as "burr Br or the like"). Specifically, as shown in FIG. 20, the burr reusing means 209 of the present embodiment comprises a first conveyor 209a that conveys the burr Br and the like in the second direction D2 (downward direction in FIG. 20), a second conveyor 209b that conveys the burr Br and the like conveyed by the first conveyor 209a in the first direction D1 (left direction in FIG. 20), and a crusher 209c (see FIG. 32) that crushes the burr Br and the like conveyed by the second conveyor 209b.

2. Arrangement of Each Component of the Molded Product Manufacturing System 201

In the molded product manufacturing system 201 of the present embodiment, the multi-axis robot 204A, the deburring device 206A and the cutting device 208A, and the multi-axis robot 204B, the deburring device 206B and the cutting device 208B are separated from each other by the blow molding machine 202. Specifically, the multi-axis robot 204A, the deburring device 206A, and the cutting device 208A are arranged at positions on one side (upper side in FIG. 20) displaced in the second direction D2 with respect to the blow molding machine 202. Further, the multi-axis robot 204A, the deburring device 206A and the cutting device 208A are arranged along the first direction D1. Here, "along the first direction D1" means that at least a part of each of the multi-axis robot 204A, the deburring device 206A, and the cutting device 208A overlaps in the first direction D1.

On the other hand, the multi-axis robot 204B, the deburring device 206B, and the cutting device 208B are arranged at positions on the other side (lower side in FIG. 20) displaced in the second direction D2 with respect to the blow molding machine 202. Further, the multi-axis robot 204B, the deburring device 206B, and the cutting device 208B are arranged along the first direction D1.

3. Each Manufacturing Process of the Molded Product Manufacturing System 201

Next, each step of a blow molding step S1, a deburring step S2, and a cutting step S3 for manufacturing the molded product using the molded product manufacturing system 201 having the above configuration will be described. In the following, the manufacturing process of the molded product using the multi-axis robot 204A, the deburring device 206A and the cutting device 208A will be described, but the same applies to the manufacturing process using the multi-axis robot 204B, the deburring device 206B, and the cutting device 208B.

3.1 Blow Molding Step S1

Figure 23B:
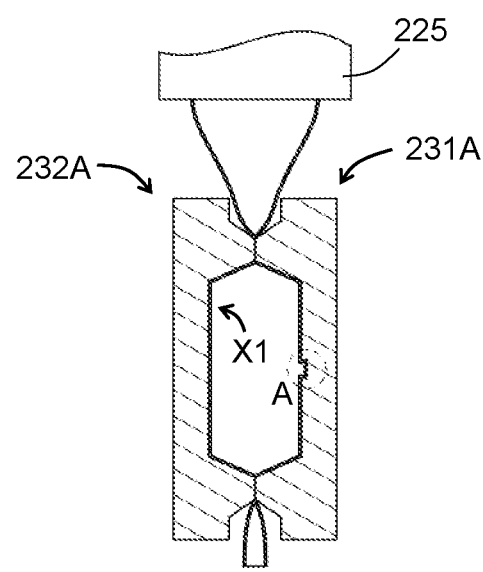
FIG. 23B is an explanatory view showing the operation of dies 231A and 232A of the blow molding machine 202 of FIG. 21.

The blow molding step S1 is a step of molding the molded body X1 from the parison 229 by the blow molding machine 202 of the above configuration. Specifically, as shown in FIGS. 23A and 23B, by clamping the parison 229 dropping from the head 225 of the resin supply device 220 by the dies 231A and 232A of the first mold clamping device 230A, the molded body X1 is molded.

By the way, in the present embodiment, the undercut structure 231u (see FIG. 24A) is provided only on the die 231A side, and not on the die 232A side. Therefore, when the dies 231A and 232A are opened to take out the molded body X1, the molded body X1 is in a state where the molded body X1 is smoothly disengaged from the die 232A and engaged with the die 231A side (see FIG. 25A). The undercut structure 231u is preferably provided at a portion of the molded main body X2 that is to be removed after molding (for example, if the molded product is a duct, a bag portion provided at the opening) or at a burr Br. This is because the engaging portion X3 (see FIG. 24B) formed by the undercut structure 231u does not remain in the molded product, which is the final product.

Figure 30:
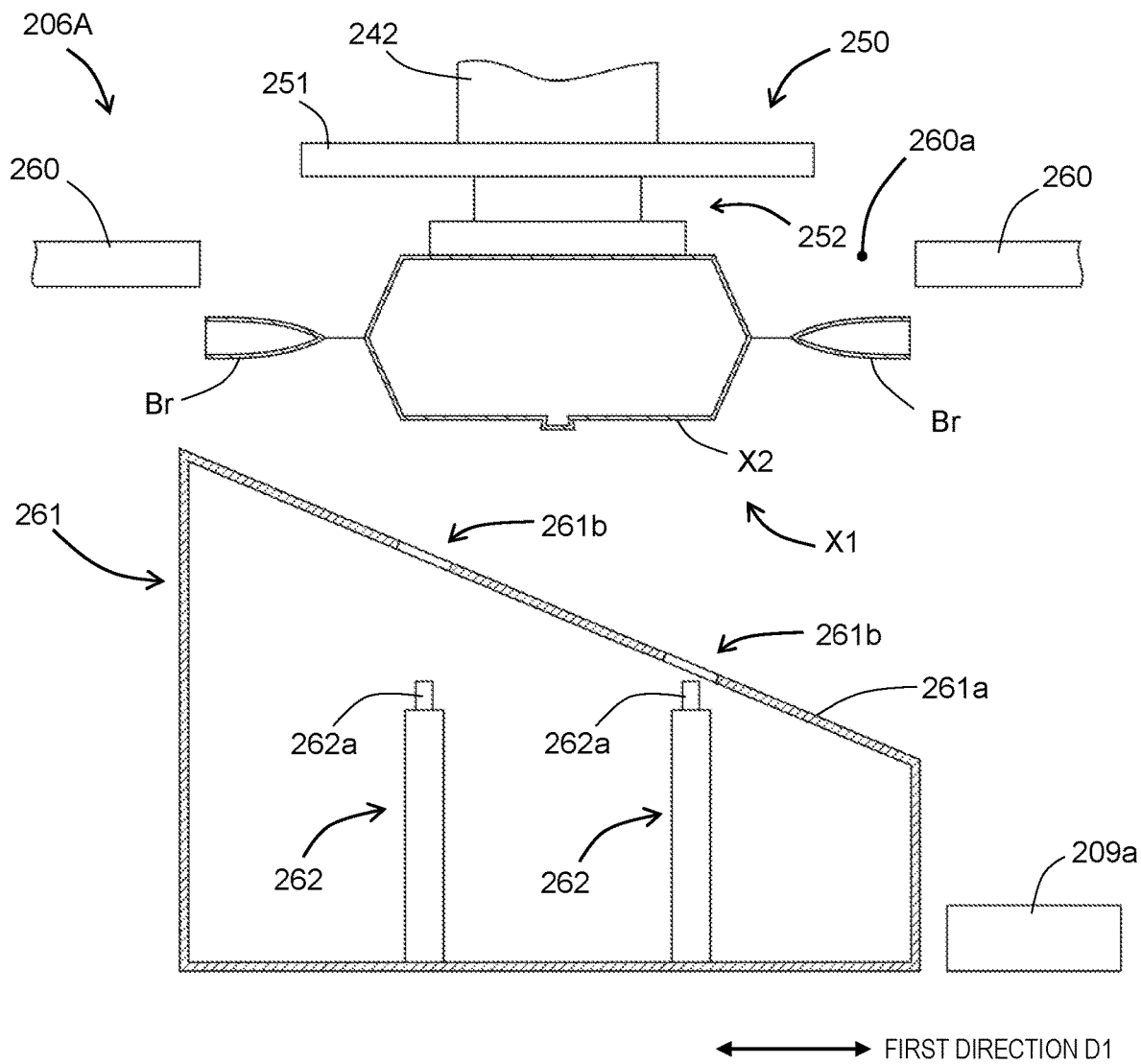
FIG. 30 is a side view showing the deburring device 206A (206B) of the molded product manufacturing system 201 of FIG. 20.

As shown in FIG. 30, the molded body X1 molded in this manner comprises a molded main body X2 that becomes a product (molded product) and a burr Br provided around the molded main body X2. The molded main body X2 has a shape that conforms to the inner surface shape of the cavities 231c and 232c. The molded main body X2 is, for example, a hollow body. The hollow body may be one in which the inside is air like a duct, or may be one in which the inside of the hollow body is filled with a filler such as foam like a sandwich panel.

Figure 25A:
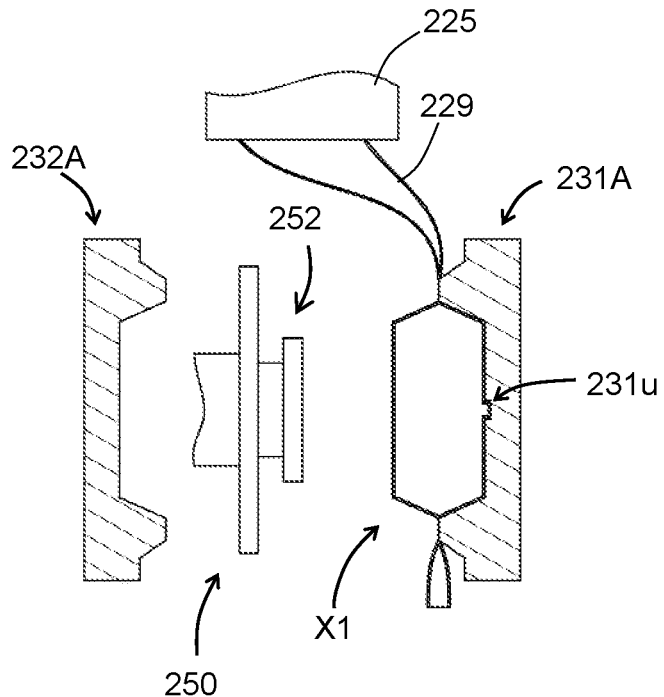
FIG. 25A is an explanatory view showing a state after opening the molds 231A and 232A from the state of FIG. 23B.
Figure 25B:
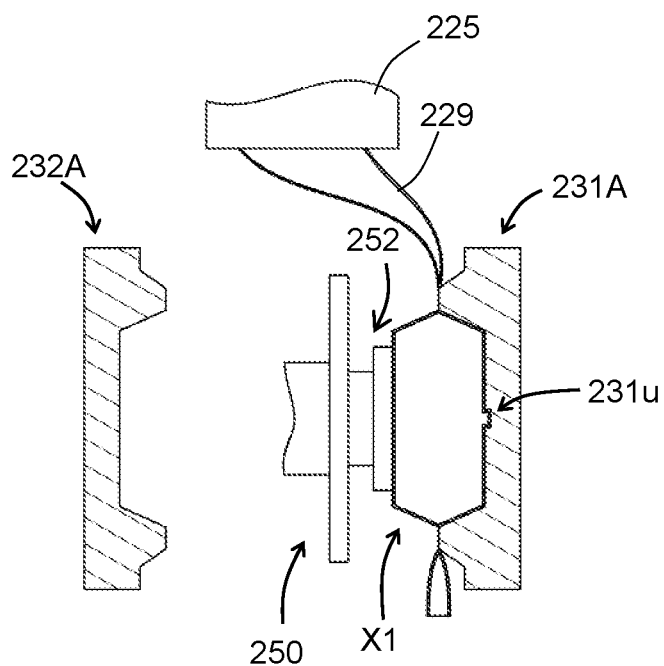
FIG. 25B is an explanatory view showing a state after a molded body X1 is held by a holding mechanism 252 of a hand portion 250 after the state of FIG. 25A.
Figure 26A:
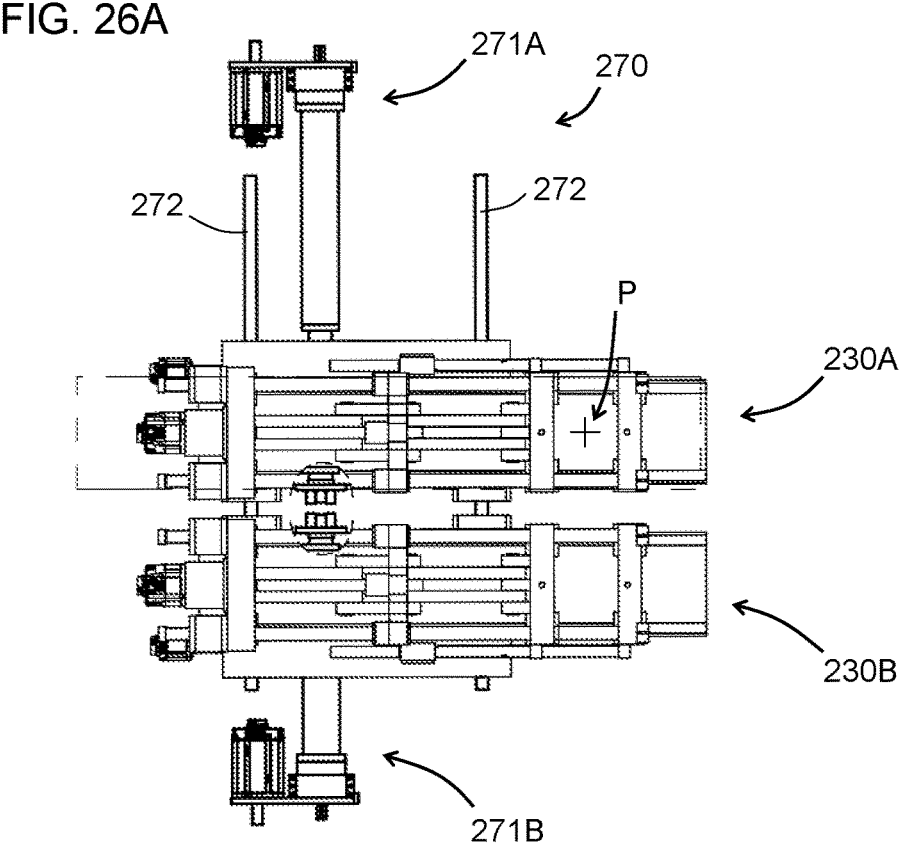
FIG. 26A is an explanatory views showing a transfer operation of a first mold clamping device 230A and a second mold clamping device 230B by a mold clamping device transfer means 270 of the blow molding machine 202 of FIG. 21.
Figure 26B:
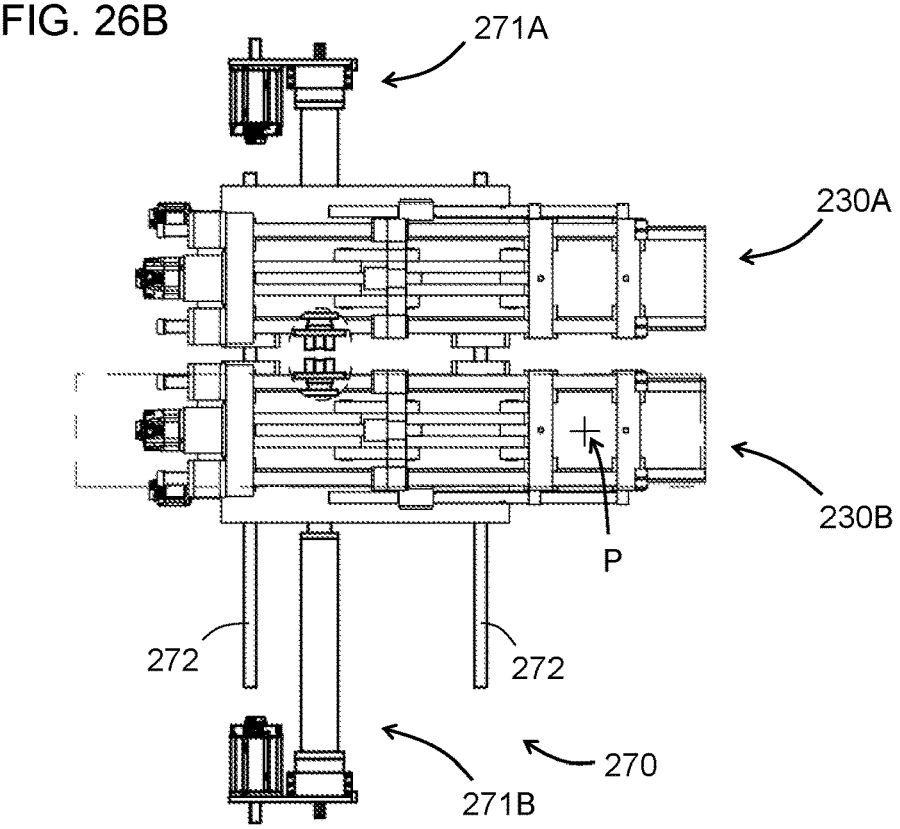
FIG. 26B is an explanatory view showing a transfer operation of a first mold clamping device 230A and a second mold clamping device 230B by a mold clamping device transfer means 270 of the blow molding machine 202 of FIG. 21.

As shown in FIGS. 25A and 25B, the body X1 after the die is opened is removed from the die 231A by the multi-axis robot 204A described later, and is transferred to the deburring device 206A for the deburring step S2.

As shown in FIG. 21, the blow molding machine 202 of the present embodiment has two mold clamping devices 230A and 230B and two corresponding electric cylinders 271A and 271B for one resin supply device 220. Therefore, the parison 229 continuously supplied from the resin supply device 220 can be alternately molded by the mold clamping devices 230A and 230B, and the molded body X1 can be continuously molded. Specifically, the electric cylinder 271A transfers the corresponding first mold clamping device 230A along the transfer rails 272 so that the first mold clamping device 230A is directly below the resin supply device 220, that is, the center of the dies 231A and 232A is at the drop point P of the parison 229 (see FIGS. 21 and 26A). Further, the electric cylinder 271B transfers the corresponding second mold clamping device 230B along the transfer rails 272 so that the second mold clamping device 230B is directly below the resin supply device 220, that is, the center of the dies 231B and 232B is at the drop point P of the parison 229 (see FIGS. 21 and 26B).

3.2 Deburring Step S2

The deburring step S2 is a step of separating the molded body X1 into the molded main body X2 and the burr Br by the deburring device 206A having the above configuration. Specifically, as shown in FIG. 30, the molded body X1 transported by the multi-axis robot 204A after completing the blow molding step S1 is in a state where the molded main body X2 is held by the holding mechanism 252 of the hand portion 250. At this time, as shown in FIG. 30, the holding mechanism 252 supports the molded main body X2 from above so that the burr Br is arranged at a position lower than the abutting members 260 of the deburring device 206A.

Figure 31A:
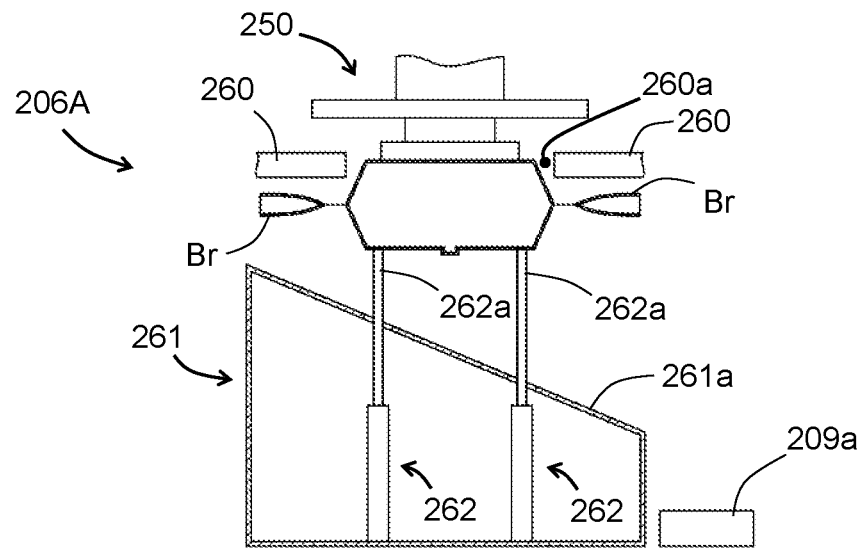
FIG. 31A is an explanatory views showing the operation of the deburring device 206A (206B) of FIG. 30.

Next, as shown in FIG. 31A, the protrusions 262a protrude so that the tips of them are brought into contact with the bottom surface of the molded main body X2. As a result, it is possible to prevent the molded main body X2 from coming off from the holding mechanism 252 when the burr Br and the abutting members 260 collide with each other.

Further, the size of the opening 260a is set so that the molded main body X2 can pass through and the burr Br collides with the abutting members 260.

Figure 31B:
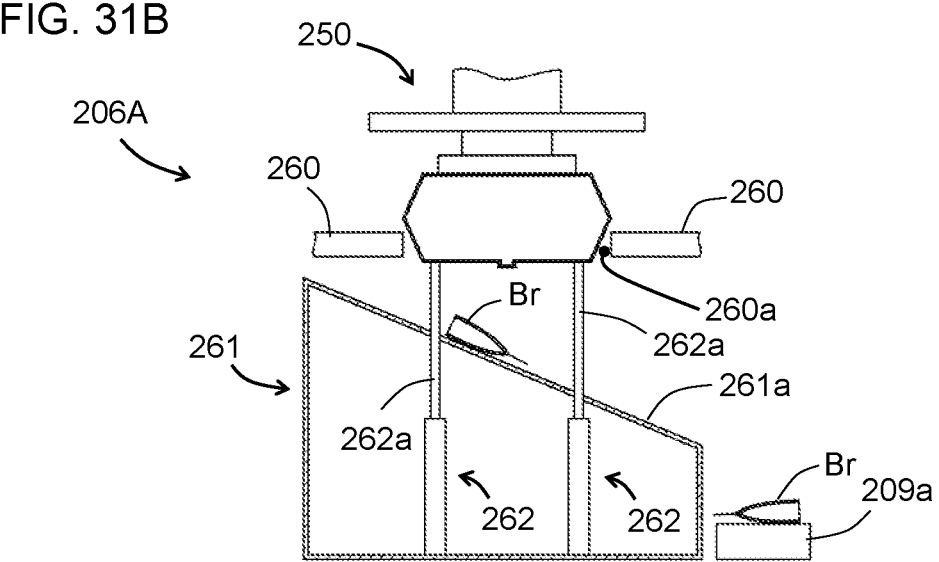
FIG. 31B is an explanatory view showing the operation of the deburring device 206A (206B) of FIG. 30.
Figure 32:
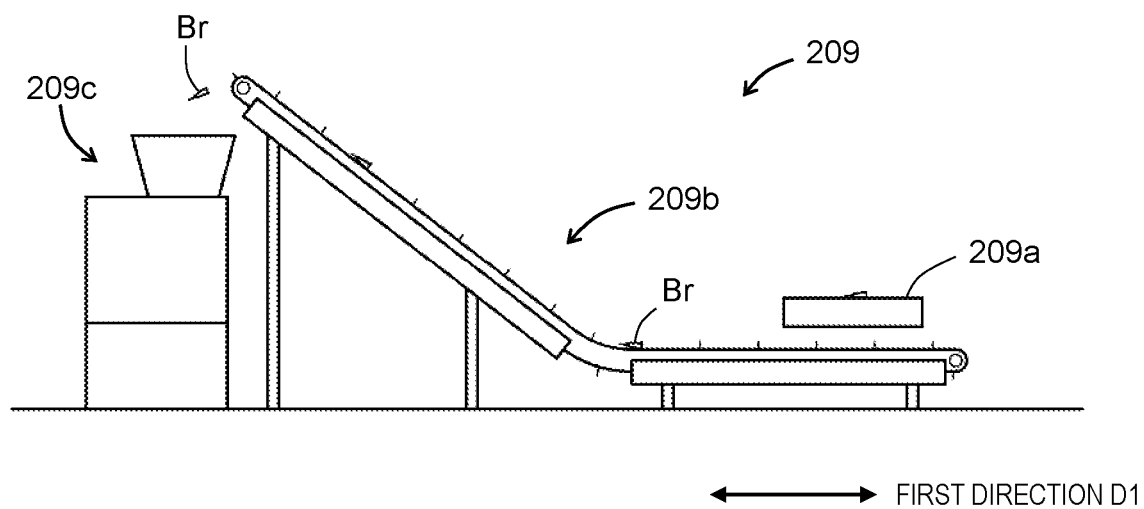
FIG. 32 is an explanatory view showing a burr reusing means 209 included in the molded product manufacturing system 201 of FIG. 20.

In this state, as shown in FIG. 31B, the abutting members 260 is moved from the hand portion 250 side toward the inclined member 261 side, that is, downward direction. As a result, the burr Br collides with the abutting members 260 and the burr Br is separated from the molded main body X2. The divided burr Br falls on the inclined surface 261a, slides along the inclined surface 261a, and is conveyed by the first conveyor 209a arranged on the downstream side of the inclined surface 261a. In some cases, the burr Br may be caught on the protrusion 262a (when the burr Br is on the entire circumference of the molded main body X2, it is always caught on the protrusion 262a). However, in such cases, the protrusion 262a is retracted after the dividing process so as not to protrude from the inclined surface 261a, and the burr Br slides down the inclined surface 261a.

The molded main body X2 is held by the holding mechanism 252 even after the burr Br is removed, and in that state, the multi-axis robot 204A moves the molded main body X2 to the place where the next cutting step S3 is performed.

After the burr Br is divided, the protruding mechanism 262 and the pair of abutting members 260 return to the state shown in FIG. 30, and are in a standby state for processing the next molded body X1.

3.3 Cutting Step S3

The cutting step S3 is a step in which the cutting device 208A cuts and removes a part of the molded main body X2 after the burr Br has been separated, for example, the bag portion when the molded product is a duct. In this step S3, the multi-axis robot 204A arranges the molded main body X2 in the cutting device 208A. The cutting device 208A cuts the arranged molded main body X2. In the present embodiment, the molded product is completed by this cutting step S3. The completed molded product is again supported by the multi-axis robot 204A and conveyed to a predetermined position.

In the molded product manufacturing system 201 of the present embodiment, the burr Br generated in the deburring step S2 and the bag portion (burr Br or the like) generated in the cutting step S3 are reused by the burr reusing means 209. Specifically, the burr Br and the like are first conveyed downward in FIG. 20 by the first conveyor 209a and then conveyed leftward in the same figure by the second conveyor 209b. The burr Br or the like conveyed by the first and second conveyors 209a and 209b, are fed into the crusher 209c (see FIG. 32), where they are pulverized and reused as raw resin 228.

4. Effect (1) The base portion 241 of the multi-axis robots 204A and 204B is fixed not to the floor surface but to the support surface 210a of the support frame 210 perpendicular to the floor surface. Therefore, it is possible to reduce the installation area. In the present embodiment, the support surface 210a that supports the base portion 241 may have an angle formed by its normal and the first direction D1 (left-right direction in FIG. 20) of 45° or less. If this condition is satisfied, the hand portion 250 of the multi-axis robots 204A and 204B can be suitably operated within the range necessary for transporting the molded body X1. Further, the base portion 241 is supported by the support surface 210a above the deburring devices 206A and 206B. Therefore, the space above the deburring devices 206A and 206B can be effectively used as the operating space for the arm portion 242 of the multi-axis robots 204A and 204B.

(2) Since the arm portions 242 of the multi-axis robots 204A and 204B have 6 degrees of freedom, complicated operations are possible. Therefore, it is possible to appropriately perform the operation of taking out the molded body X1 from the mold clamping devices 230A and 230B, the deburring operation by the deburring devices 206A and 206B, and the cutting operation by the cutting devices 208A and 208B as a series of operations.

(3) The multi-axis robot 204A (204B), the deburring device 206A (206B), and the cutting device 208A (8B) are arranged along the first direction D1. Therefore, it is possible to save space in the second direction. Further, it is possible to improve workability such as maintenance.

(4) The deburring devices 206A and 206B of the present embodiment separates the burr Br from the molded body X1 while the multi-axis robot supports the molded main body X2 from above. Since the deburring devices 206A and 206B have such a configuration, by arranging the support frame 210 of the multi-axis robots 204A and 204B above the deburring devices 206A and 206B, it becomes easy to support the molded main body X2.

(5) Of the pair of dies 231A and 232A (231B and 232B), only the die 231A (231B) has the undercut structure 231u. Therefore, since the molded body X1 is always opened in a state of being engaged with one of the dies 231A (231B), the multi-axis robots 204A and 204B can easily take out the molded body X1 from the mold.

(6) In the blow molding machine 202, two mold clamping devices, the first mold clamping device 230A and the second mold clamping device 230B, share one resin supply device 220.

Therefore, it is possible to reduce the installation area.

5. Variation

The invention of the third aspect can also be implemented in the following embodiments:

The molded product manufacturing system 201 of the above embodiment comprises two mold clamping devices 230A and 230B, two multi-axis robots 204A and 204B, two deburring devices 206A and 206B, and two cutting devices 208A and 208B. However, it is also possible to configure the molded product manufacturing system 201 to have only one of each of these devices.

In the above embodiment, the arm portion 242 of the multi-axis robots 204A and 204B has a configuration having 6 degrees of freedom, but it can also be configured to have 7 or more degrees of freedom.

The deburring devices 206A and 206B of the above-described embodiment move the pair of abutting members 260 as the deburring mechanism downward direction while the molded body X1 is supported by the multi-axis robots 204A and 204B, thereby separating the molded main body X2 from the burrs Br. However, it is not limited to such a configuration. That is, the deburring mechanism and the molded body X1 supported by the multi-axis robots 204A and 204B may be relatively moved so that the deburring mechanism is brought into contact with the burr Br. For example, the deburring mechanism may not be moved, but the molded body X1 supported by the multi-axis robots 204A and 204B may be moved in the vertical direction to bring the burr Br into contact with the deburring mechanism. Further, the direction of relative movement is not limited to the vertical direction, and the burr Br can be removed by relatively moving in any direction including the first direction D1 and the second direction D2.

REFERENCE SIGN LIST

First Viewpoint

1: molding apparatus, 2: mold clamping device, 6: electric cylinder, 10: transfer rail, 11: extruder, 11h: head, 21: movable base, 21a: guide block, 21b: through hole, 22: mold clamping rail, 23: first platen, 23a: guide block, 23d: fixing member, 24: second platen, 24a: guide block, 24b: bracket, 24c: pin, 24d: fixing member, 25: third platen, 25a: guide block, 25b: bracket, 25c: pin, 26-29: tie bar, 30: clamping drive unit, 31: slide drive means, 32: clamping servomotor, 33: ball screw, 34: ball nut, 41: toggle mechanism, 42: first toggle link, 43: second toggle link, 44: auxiliary link, 45: connecting member, 46-48: pin, 50: clamping reference plane holding unit, 51: pinion holding member, 52: pinion, 53: first rack, 53a: teeth, 54: second rack, 54a: teeth, 60: brake motor, 61: motor, 61a: shaft, 62: brake, 70: speed reducer, 80: slip clutch, 90: ball screw mechanism, 91: ball screw, 92: nut, 93: rod, 93a: fixing portion, 94: outer cylinder, 500: deburring device, 501: robot arm, 502: support member, 503: swing member, 503a: arm, 503b: rotating shaft, 513: removal piece, MA: split die, MB: split die, P: drop point, S: clamping reference plane, X: molded body, Xb: burr Second Viewpoint 101: molding apparatus, 102: mold clamping device, 102b: bracket, 104: transfer means, 107: extruder, 107h: head, 108A: split die, 108B: split die, 121: movable base, 121a: guide block, 122-124: tie bar, 126: first platen, 127: second platen, 127b,128b: bracket, 128: third platen, 129: clamping drive unit, 130: clamping servomotor, 131: disk, 132: link arm, 133: link arm, 141,141a,141b: transfer rail, 141c: rail for the rotary drive means, 142: rotary drive means, 143: link mechanism, 144: transfer servomotor, 145: speed reducer, 146: first arm, 147: first rotating shaft, 148: second arm, 149: second rotating shaft, 150: fixing member, 151: first rotating shaft, 152: first arm, 153: second rotating shaft, 154: second arm, 155: third rotating shaft, 156: third arm, 157: fourth rotating shaft, 158: output shaft, P: drop point, S: clamping reference plane Third Viewpoint 201: molded product manufacturing system, 202: blow molding machine, 204A,204B: multi-axis robot, 206A, 206B: deburring device, 208A,208B: cutting device, 209: burr reusing means, 209a: first conveyor, 209b: second conveyor, 209c: crusher, 210: support frame, 210a: support surface, 220: resin supply device, 221: hopper, 222: extruder, 222a: cylinder, 223: injector, 224: accumulator, 224a: cylinder, 224b: piston, 225: head, 226,227: connecting pipe, 228: raw resin, 228a: molten resin, 229: parison, 230A: first mold clamping device (mold clamping device), 230B: second mold clamping device (mold clamping device), 231A,231B,232A,232B: die, 231c,232c: cavity, 231p,232p: pinch-off portion, 231u: undercut structure, 233: movable base, 233a: mold clamping rail, 234: first platen, 235: second platen, 236: third platen, 237: tie bar, 238: clamping drive unit, 238*a*: toggle mechanism, 238*b*: servomotor, 238*c*: ball screw, 239: clamping reference plane holding unit, 239*a*: pinion, 239*b*,239*c*: rack, 241: base portion, 242: arm portion, 243: rotation base portion, 244: first arm, 245: second arm, 246: third arm, 247: wrist portion, 250: hand portion, 251: main body portion, 252: holding mechanism, 260: abutting members, 260*a*: opening, 261: inclined member, 261*a*: inclined surface, 261*b*: through hole, 262: protruding mechanism, 262*a*: protrusion, 270: mold clamping device transfer means, 271A: first electric cylinder, 271B: second electric cylinder, 272: transfer rail, 273: brake motor, 274: ball screw mechanism, A: region, Br: burr, D1: first direction, D2: second direction, L1~L6: first to sixth axis, P: drop point, S: clamping reference plane, X1: molded body, X2: molded main body, X3: engaging portion

The invention claimed is:

1. A molded product manufacturing system having a blow molding machine, a multi-axis robot, a support frame, and a deburring device, wherein,
a pair of dies of the blow molding machine are arranged so as to open in a first direction substantially parallel to a ground plane,
the multi-axis robot comprises a base portion and a multi-axis arm portion connected to the base portion, and is configured to convey a molded body molded by the blow molding machine by a hand portion mounted on the arm portion,
the support frame has a support surface that supports the base portion, said support surface having a normal defined perpendicular to the support surface,
the deburring device is configured to separate the molded body into a molded main body that will become a molded product and a burr,
the multi-axis robot and the deburring device are arranged at positions displaced from the blow molding machine in a second direction perpendicular to the first direction and a vertical axis,
the multi-axis robot has at least 6 degrees of freedom,
the normal of the support surface and the first direction are in the same direction
the deburring device comprises a pair of abutting members, wherein a size of an opening between the abutting members can be changed, and
the deburring device is configured to separate the burr from the molded main body by colliding the burr with the pair of abutting members while the size of the opening is set so that the molded main body can pass through and the burr collides with the pair of abutting members.

2. The molded product manufacturing system according to claim 1, wherein the base portion is supported by the support surface above the deburring device.

3. The molded product manufacturing system according claim 1, wherein the multi-axis robot and the deburring device are arranged along the first direction.

4. The molded product manufacturing system according to claim 3, wherein a cutting device for cutting the molded main body is further provided, and the multi-axis robot, the deburring device, and the cutting device are arranged along the first direction.

5. The molded product manufacturing system according to claim 1, wherein the deburring device separates the burr from the molded main body while the multi-axis robot supports the molded body from above.

6. The molded product manufacturing system according to claim 1, wherein one of the pair of dies has an undercut structure.

7. The molded product manufacturing system according to claim 1, wherein,
the blow molding machine comprises a resin supply device, first and second mold clamping devices, and a mold clamping device transfer means,
the resin supply device is configured to drop a parison,
the first and second mold clamping device each include the pair of dies,
the mold clamping device transfer means is configured to transfer the first and second mold clamping device in the second direction so that the first and second mold clamping device each can clamp the parison,
two multi-axis robots and two deburring devices are provided, and,
the one multi-axis robot and the one deburring device are provided on one side of the blow molding machine, and the other multi-axis robot and the other deburring device are provided on the other side of the blow molding machine.

* * * * *